United States Patent
Yabe et al.

(10) Patent No.: US 10,699,037 B2
(45) Date of Patent: Jun. 30, 2020

(54) LAYOUT GENERATION SYSTEM, ENERGY MANAGEMENT SYSTEM, TERMINAL DEVICE, LAYOUT GENERATION METHOD, AND PROGRAM

(71) Applicant: Mitsubishi Electric Corporation, Tokyo (JP)

(72) Inventors: Masaaki Yabe, Tokyo (JP); Ichiro Maruyama, Tokyo (JP); Satoshi Minezawa, Tokyo (JP); Toshiaki Yoshikawa, Tokyo (JP); Hirotoshi Yano, Tokyo (JP); Daisuke Iizawa, Tokyo (JP); Kenichiro Tanaka, Tokyo (JP); Takashi Ogino, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 513 days.

(21) Appl. No.: 14/888,998

(22) PCT Filed: Nov. 25, 2013

(86) PCT No.: PCT/JP2013/081649
§ 371 (c)(1),
(2) Date: Nov. 4, 2015

(87) PCT Pub. No.: WO2014/196098
PCT Pub. Date: Dec. 11, 2014

(65) Prior Publication Data
US 2016/0147919 A1    May 26, 2016

(30) Foreign Application Priority Data

Jun. 5, 2013    (JP) .................................. 2013-118986

(51) Int. Cl.
*G05B 15/02*        (2006.01)
*G05B 19/042*       (2006.01)
(Continued)

(52) U.S. Cl.
CPC ............. *G06F 30/18* (2020.01); *G05B 15/02* (2013.01); *G06F 30/13* (2020.01);
(Continued)

(58) Field of Classification Search
CPC ... G06F 17/509; G06F 17/5004; G05B 15/02; H04L 12/2803; H04L 12/2816
(Continued)

(56) References Cited

U.S. PATENT DOCUMENTS 8,688,241 B2 *  4/2014  Matsui ............... G05B 19/0421
                                              700/9
9,343,907 B2 *  5/2016  Takahashi ................ H02J 4/00
(Continued)

FOREIGN PATENT DOCUMENTS

CN          1627721 A      6/2005
CN        102346879 A      2/2012
(Continued)

OTHER PUBLICATIONS

International Search Report of the International Searching Authority dated Feb. 10, 2014 for the corresponding international application No. PCT/JP2013/081649 (and English translation).

(Continued)

*Primary Examiner* — Ly D Pham
(74) *Attorney, Agent, or Firm* — Posz Law Group, PLC

(57) ABSTRACT

A device information acquirer acquires device information collected by a controller. A floor plan editor edits a simplified floor plan of a home by individually adding a configuration of a room where an electric device is installed, in accordance with a user operation. A device icon positioner positions an icon of the electric device in each room in the floor plan edited by the floor plan editor, in accordance with the user operation. A layout generator generates layout
(Continued)

information for the electric device in the home, based on the edited floor plan and the positioned icon.

16 Claims, 30 Drawing Sheets

(51) Int. Cl.
  *G06F 17/50* (2006.01)
  *H04L 12/28* (2006.01)
  *G06F 30/18* (2020.01)
  *G06F 30/13* (2020.01)
  *H04L 12/24* (2006.01)
  *H04L 29/06* (2006.01)
  *H04L 29/08* (2006.01)

(52) U.S. Cl.
  CPC ...... *H04L 12/2803* (2013.01); *H04L 12/2816* (2013.01); *G05B 19/042* (2013.01); *H04L 12/2812* (2013.01); *H04L 12/2814* (2013.01); *H04L 41/22* (2013.01); *H04L 63/10* (2013.01); *H04L 67/125* (2013.01)

(58) Field of Classification Search
  USPC .......................................................... 700/275
  See application file for complete search history.

(56) References Cited

U.S. PATENT DOCUMENTS

| | | | | |
|---|---|---|---|---|
| 9,651,930 | B2* | 5/2017 | Nakatani | G05B 19/0426 |
| 2001/0021884 | A1* | 9/2001 | Shinyagaito | H04L 12/2803 |
| | | | | 700/275 |
| 2002/0032546 | A1 | 3/2002 | Imamura et al. | |
| 2003/0038730 | A1 | 2/2003 | Imafuku et al. | |
| 2003/0097814 | A1 | 5/2003 | Furukawa | |
| 2004/0260407 | A1* | 12/2004 | Wimsatt | G05B 15/02 |
| | | | | 700/19 |
| 2004/0260427 | A1* | 12/2004 | Wimsatt | G05B 15/02 |
| | | | | 700/275 |
| 2004/0267385 | A1* | 12/2004 | Lingemann | G05B 15/02 |
| | | | | 700/83 |
| 2005/0131931 | A1 | 6/2005 | Kawajiri | |
| 2006/0028212 | A1* | 2/2006 | Steiner | H05B 37/029 |
| | | | | 324/527 |
| 2008/0221715 | A1* | 9/2008 | Krzyzanowski | H04L 12/2805 |
| | | | | 700/90 |
| 2009/0066534 | A1* | 3/2009 | Sivakkolundhu | H04L 12/281 |
| | | | | 340/4.32 |
| 2009/0265217 | A1* | 10/2009 | Aurenz | G08C 17/02 |
| | | | | 709/218 |
| 2010/0019052 | A1* | 1/2010 | Yip | G05D 23/19 |
| | | | | 236/91 C |
| 2010/0312366 | A1* | 12/2010 | Madonna | H05B 37/0245 |
| | | | | 700/90 |
| 2011/0106996 | A1* | 5/2011 | Rosso | G06F 13/409 |
| | | | | 710/300 |
| 2011/0271208 | A1* | 11/2011 | Jones | H04L 12/1822 |
| | | | | 715/753 |
| 2012/0023215 | A1* | 1/2012 | Tseng | H04L 12/2809 |
| | | | | 709/223 |
| 2013/0150686 | A1* | 6/2013 | Fronterhouse | G06F 19/3418 |
| | | | | 600/323 |
| 2013/0218349 | A1* | 8/2013 | Coogan | G05B 13/02 |
| | | | | 700/275 |
| 2013/0289770 | A1* | 10/2013 | Rawls-Meehan | G05B 15/02 |
| | | | | 700/275 |
| 2013/0304268 | A1* | 11/2013 | Pernia | G06F 1/26 |
| | | | | 700/286 |
| 2013/0311912 | A1 | 11/2013 | Aso et al. | |
| 2013/0345882 | A1* | 12/2013 | Dushane | G05B 15/02 |
| | | | | 700/276 |
| 2014/0067137 | A1* | 3/2014 | Amelio | H03K 17/00 |
| | | | | 700/286 |
| 2014/0114621 | A1* | 4/2014 | Brigandi | G06F 17/5004 |
| | | | | 703/1 |
| 2014/0259074 | A1* | 9/2014 | Ansari | H04N 21/482 |
| | | | | 725/50 |
| 2014/0288715 | A1* | 9/2014 | Beaujeu | G05B 15/02 |
| | | | | 700/275 |
| 2014/0358285 | A1* | 12/2014 | Aggarwal | G05B 15/02 |
| | | | | 700/275 |
| 2015/0088288 | A1* | 3/2015 | Madonna | G01S 5/02 |
| | | | | 700/90 |
| 2015/0113414 | A1* | 4/2015 | Sasaki | G06F 3/04817 |
| | | | | 715/735 |
| 2015/0276253 | A1* | 10/2015 | Montalvo | G06Q 10/06 |
| | | | | 700/276 |
| 2015/0347683 | A1* | 12/2015 | Ansari | G06F 19/322 |
| | | | | 726/7 |
| 2015/0372539 | A1* | 12/2015 | Livadaras | G05B 15/02 |
| | | | | 700/297 |
| 2016/0010889 | A1* | 1/2016 | Hashimoto | G08C 17/02 |
| | | | | 700/276 |
| 2016/0132046 | A1* | 5/2016 | Beoughter | G06F 17/30554 |
| | | | | 700/17 |
| 2016/0295665 | A1* | 10/2016 | Aggarwal | H05B 37/0245 |
| 2016/0301543 | A1* | 10/2016 | Minezawa | G08C 17/02 |
| 2016/0309569 | A1* | 10/2016 | Rangineni | G05B 15/02 |
| 2017/0111182 | A1* | 4/2017 | Ansari | H04L 12/2807 |

FOREIGN PATENT DOCUMENTS

| | | |
|---|---|---|
| CN | 102760060 A | 10/2012 |
| JP | H10-224875 A | 8/1998 |
| JP | 2002-063231 A | 2/2002 |
| JP | 2002-163308 A | 6/2002 |
| JP | 2002-291039 A | 10/2002 |
| JP | 2003-052093 A | 2/2003 |
| JP | 2003-162553 A | 6/2003 |
| JP | 2003-283524 A | 10/2003 |
| JP | 2004-007297 A | 1/2004 |
| JP | 2004-185496 A | 7/2004 |
| JP | 2005-198252 A | 7/2005 |
| JP | 2005-209066 A | 8/2005 |
| JP | 2005-339174 A | 12/2005 |
| JP | 2008-123240 A | 5/2008 |
| JP | 2009-151683 A | 7/2009 |
| WO | 2013/014874 A1 | 1/2013 |

OTHER PUBLICATIONS

Office Action dated Oct. 8, 2013 issued in corresponding JP patent application No. 2013-118986 (and partial English translation).
Office Action dated Jan. 6, 2015 issued in corresponding JP patent application No. 2014-019298 (and partial English translation).
Office action dated Dec. 18, 2017 issued in the corresponding CN patent application No. 201380077049.0 (and English translation thereof).
Office Action dated May 2, 2018 issued in corresponding CN patent application No. 201380077049.0 (and English translation).
Office Action dated Feb. 12, 2019 issued in corresponding CN patent application No. 201380077049.0 (and English translation).
Office action dated Oct. 19, 2018 issued in corresponding CN patent application No. 201380077049.0 (and English translation thereof).

* cited by examiner

FIG. 4

| DEVICE ID NUMBER | DEVICE TYPE | SERIAL NUMBER | POWER RATING | ... |
|---|---|---|---|---|
| 0001 | A/C | M52-AABBB | 500W | ... |
| 0002 | A/C | M52-ABCDE | 900W | ... |
| 0003 | A/C | M53-ABCDE | 500W | ... |
| 0004 | A/C | M53-BBCCC | 800W | ... |
| 0005 | A/C | M53-CCDDD | 500W | ... |
| 0006 | TV | M11-ABCDE | 400W | ... |
| 0007 | TV | M12-BCDEF | 100W | ... |
| 0008 | TV | M13-ABBCC | 400W | ... |
| 0009 | REFRIGERATOR | M34-CDEFG | 300W | ... |
| 0010 | INDUCTION COOKER | M39-CCDDD | 200W | ... |
| ... | ... | ... | ... | ... |

FIG. 5

| ROOM ID NUMBER | FLOOR | ROOM NAME | ... |
|---|---|---|---|
| 101 | 1 | DINING ROOM | ... |
| 102 | 1 | LIVING ROOM | ... |
| 201 | 2 | STUDY | ... |
| 202 | 2 | BEDROOM | ... |
| 203 | 2 | KIDS ROOM | ... |
| ... | ... | ... | ... |

| DEVICE ID NUMBER | ROOM ID NUMBER | DEVICE NAME | ... |
|---|---|---|---|
| 0001 | 203 | KIDS ROOM A/C | ... |
| 0002 | 102 | LIVING ROOM A/C | ... |
| 0003 | 201 | STUDY A/C | ... |
| 0004 | 101 | DINING ROOM A/C | ... |
| 0005 | 202 | BEDROOM A/C | ... |
| 0006 | 101 | DINING ROOM TV | ... |
| 0007 | 202 | BEDROOM TV | ... |
| 0008 | 400 | LIVING ROOM TV | ... |
| 0009 | 101 | DINING ROOM REFRIGERATOR | ... |
| 0010 | 101 | DINING ROOM COOKER | ... |
| ... | ... | ... | ... |

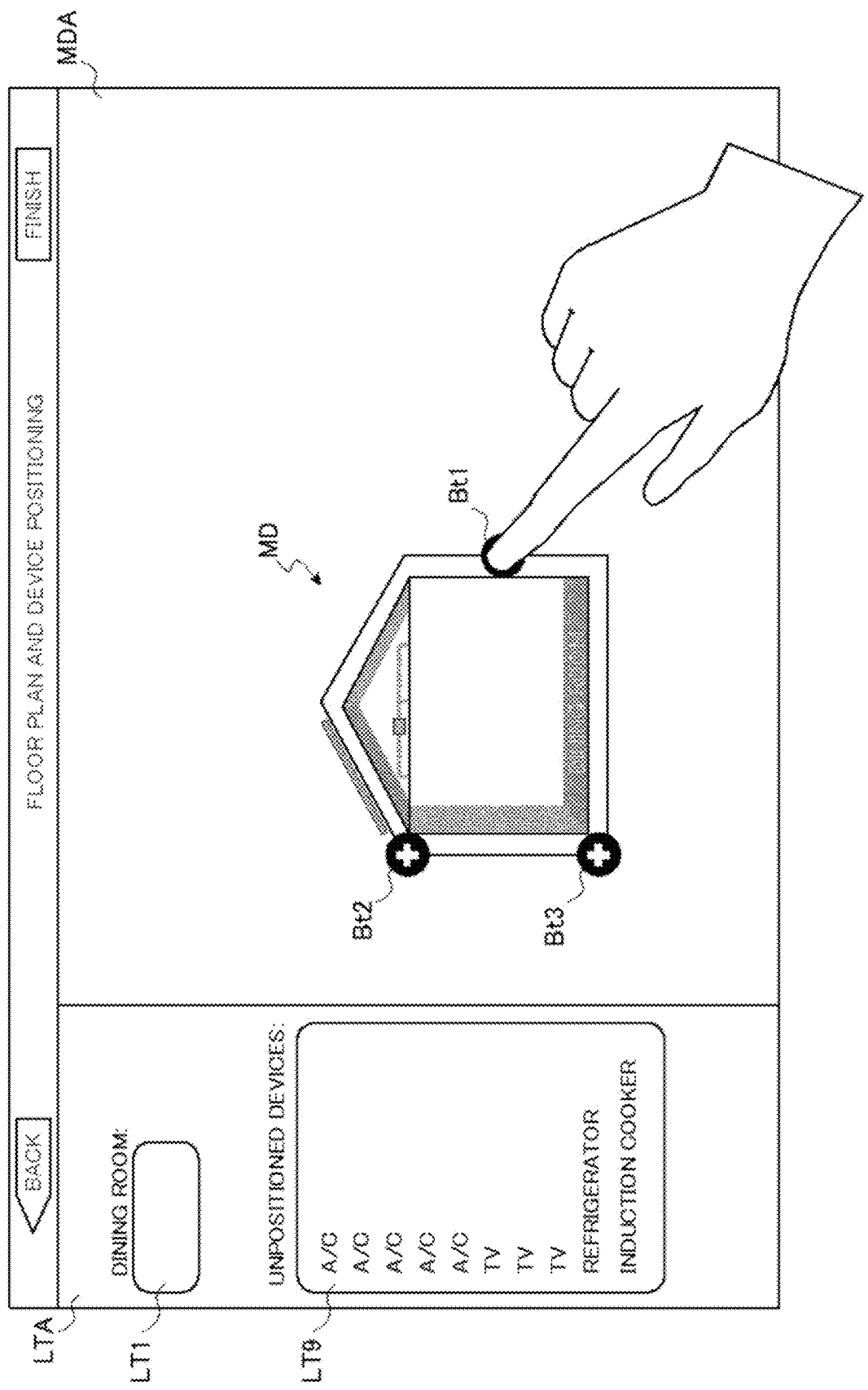

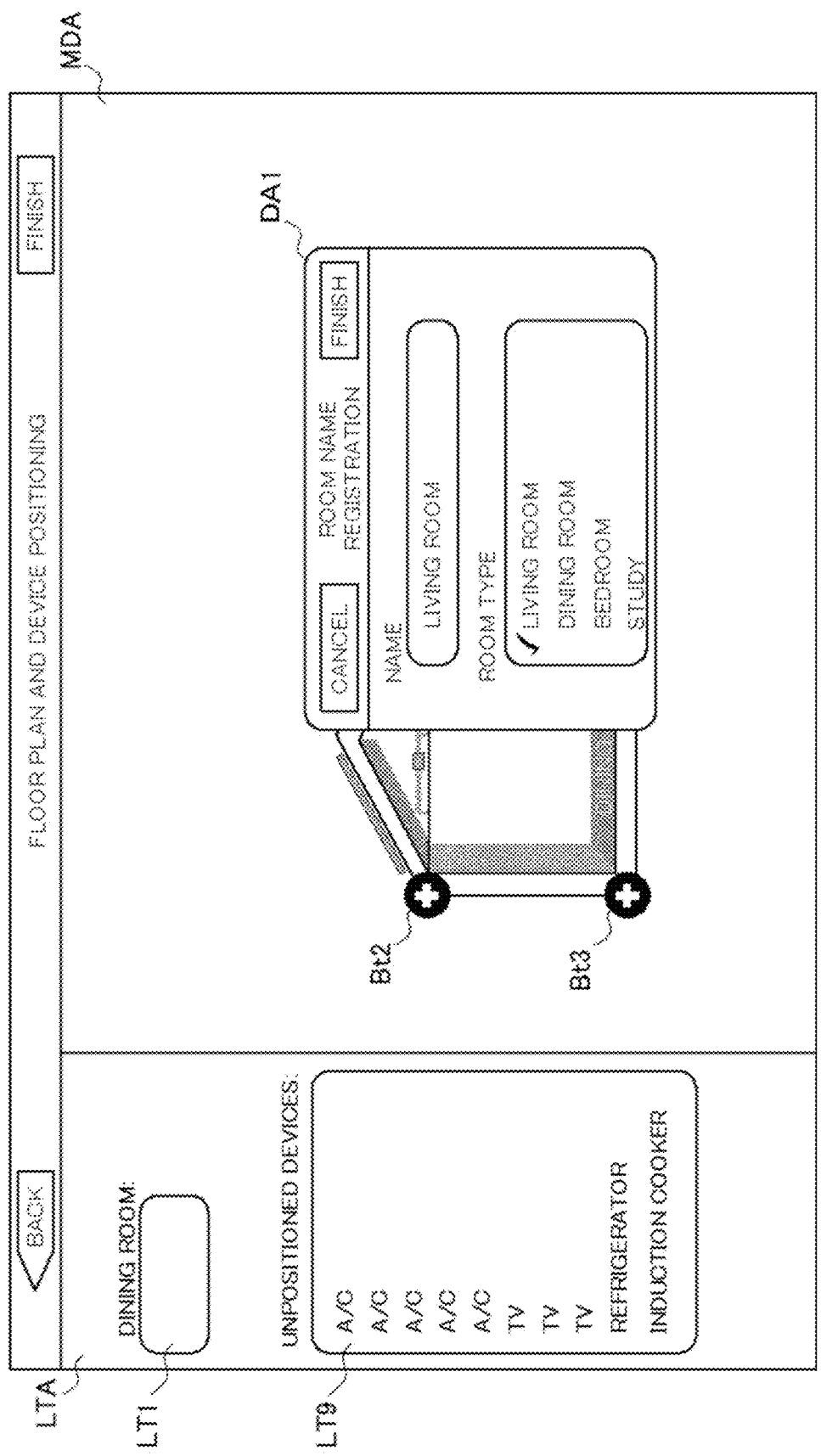

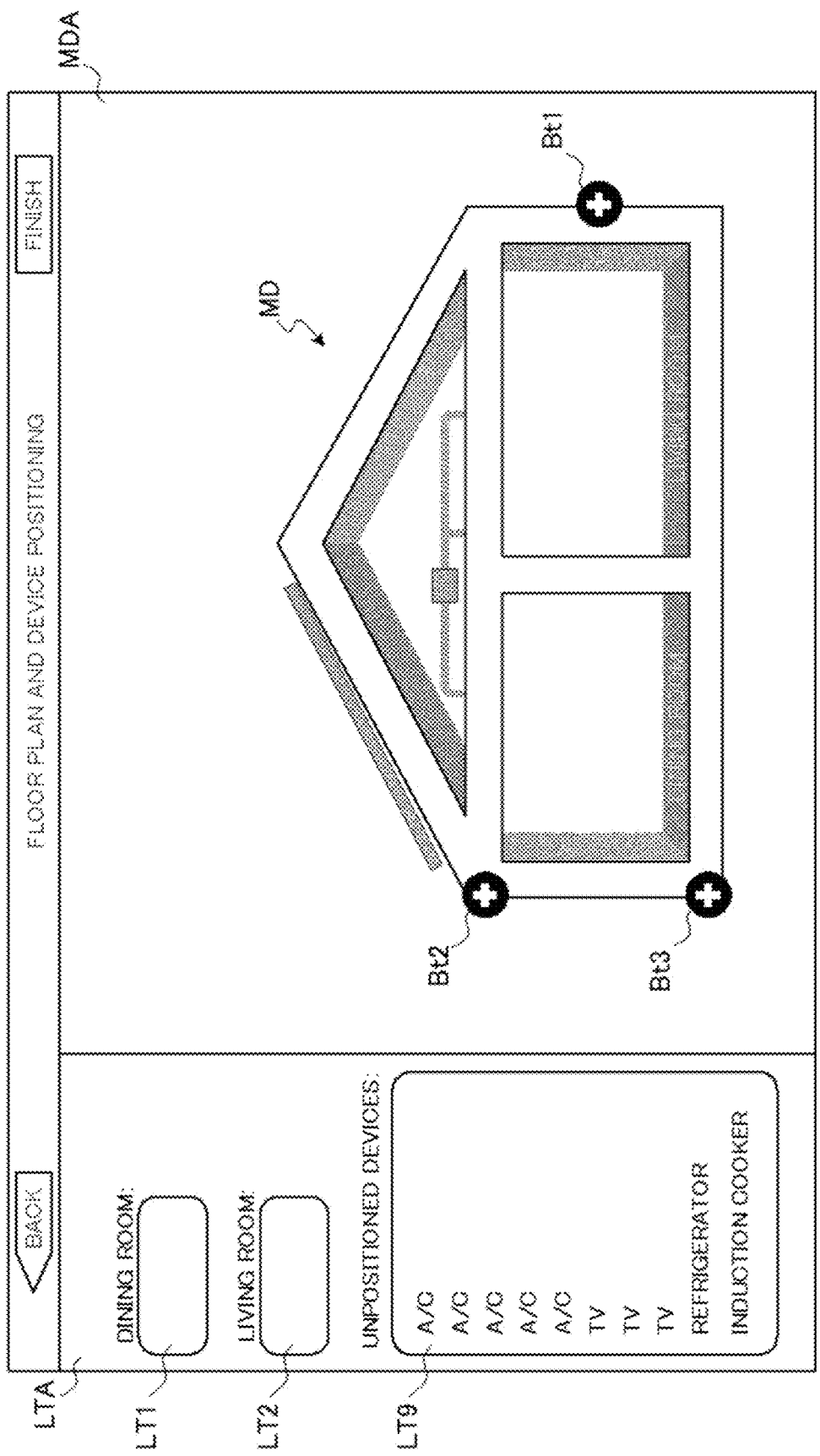

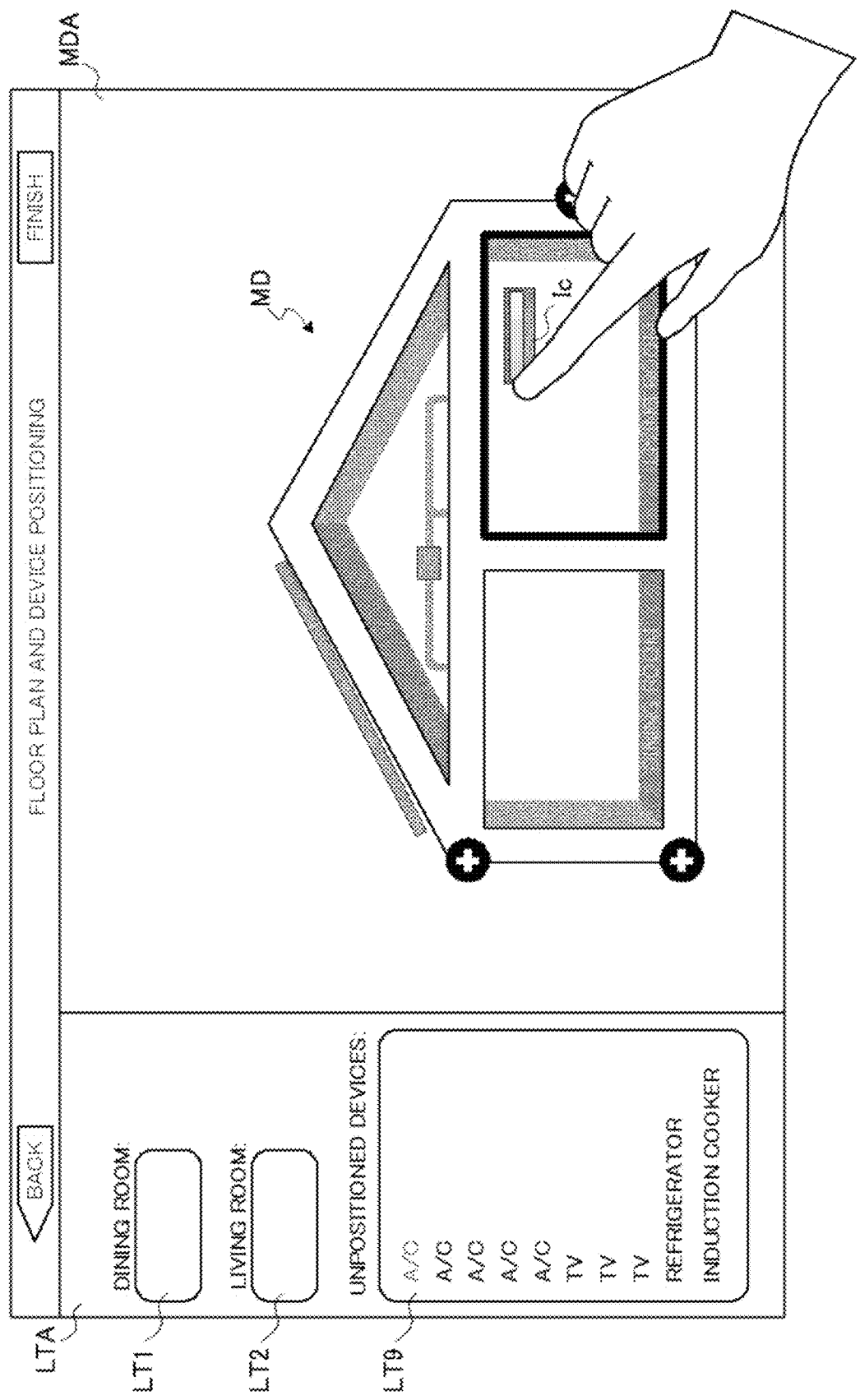

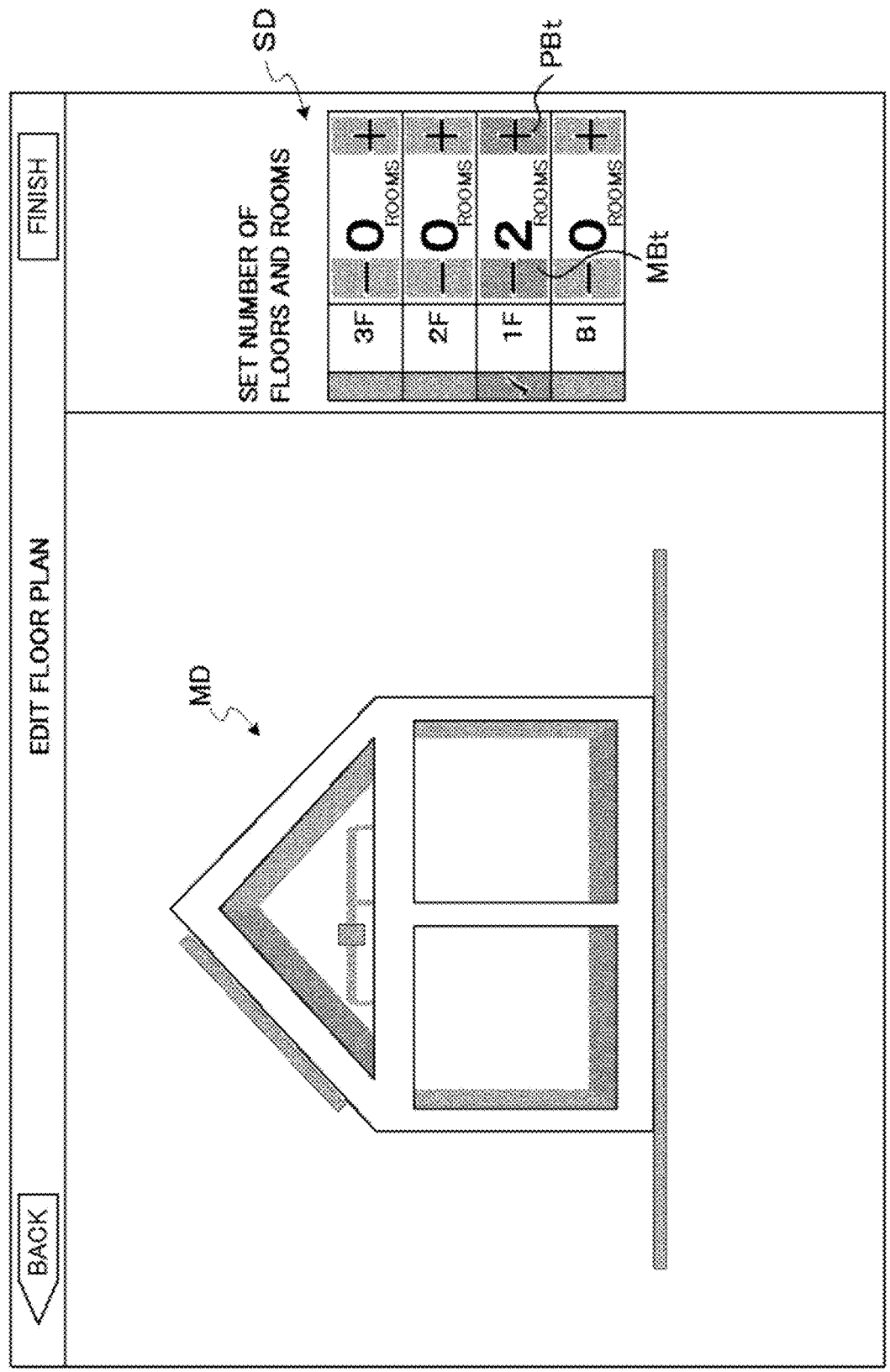

LAYOUT GENERATION SYSTEM, ENERGY MANAGEMENT SYSTEM, TERMINAL DEVICE, LAYOUT GENERATION METHOD, AND PROGRAM

CROSS REFERENCE TO RELATED APPLICATIONS

This application is a U.S. national stage of International Patent Application No. PCT/JP2013/081649 filed on Nov. 25, 2013, which claims priority to Japanese Patent Application No. 2013-118986 filed on Jun. 5, 2013, the contents of which are incorporated herein by reference.

TECHNICAL FIELD

The present disclosure relates to technology enabling the easy generation of layout information for electric devices connected to a network in a home.

BACKGROUND ART

Recently, in typical households, home network systems connecting various electric devices according to a predetermined communication standard are becoming common. In the home network system, electric devices such as an air conditioner, lighting equipment, a rice cooker, an induction cooker, and a dehumidifier are communicably connected, thereby enabling management (monitoring and control) of each electric device.

Regarding conventional technology related to such a home network system, for example, Patent Literature 1 discloses a system enabling the intuitive configuration of an installation position with a simple operation when connecting a new device to the home network.

CITATION LIST

Patent Literature

Unexamined Japanese Patent Application Kokai Publication No. 2005-198252

SUMMARY OF INVENTION

Technical Problem

In the system of Patent Literature 1 above, a floor plan image and an icon image indicating a new device are displayed on a terminal, a position of a move destination of the icon image (position on the floor plan) input with a mouse operation by a user is acquired, an installation position of the device is computed, and layout information for the device (more specifically, location information indicating the installation position) is generated. However, with this system, generating a floor plan image requires floor plan data, home data, and room parts data for which dimensions and proportions are respectively defined. Although not clearly described in Patent Literature 1, preparing data including such dimensions, proportions, and the like is extremely difficult for the user, and thus in an actual system, a vendor is assumed to generate this data on the basis of information such as the blueprints of the home, and supply the data to the user. For this reason, there is a problem in that the user is unable to freely edit the floor plan image, and as a result, device layout information cannot be generated easily.

The present disclosure was devised to solve problems like the above, and an objective thereof is to provide a layout generation system, an energy management system, a terminal device, a layout generation method, and a program enabling the easy generation of layout information for electric devices connected to a network in a home.

Solution to Problem

In order to achieve the above objective, a layout generation system according to the present disclosure is a layout generation system for generating layout information for an electric device connected to a network in a home, comprising:

an editor configured to edit a simplified floor plan of the home by individually adding a configuration of a room where the electric device is installed, in accordance with a user operation;

a positioner configured to position an icon of the electric device in each room in the edited floor plan, in accordance with the user operation; and a generator configured to generate layout information for the electric device in the home, based on the edited floor plan and the positioned icon.

Advantageous Effects of Invention

According to the present disclosure, layout information for electric devices connected to a network in a home is easily generatable.

BRIEF DESCRIPTION OF DRAWINGS

FIG. 4 is a partial table illustrating an example of device information;

FIG. 5 is a partial table illustrating an example of floor plan information;

FIG. 6 is a partial table illustrating an example of layout information;

FIG. 7A is a schematic diagram illustrating an example of an editing screen in a case of adding a room;

FIG. 7B is a schematic diagram illustrating an example of the editing screen in the case of adding the room;

FIG. 7C is a schematic diagram illustrating an example of the editing screen in the case of adding the room;

FIG. 8B is a schematic diagram illustrating an example of the editing screen in the case of positioning the device;

FIG. 17A is a schematic diagram for explaining a floor plan editing technique according to another embodiment of the present disclosure;

DESCRIPTION OF EMBODIMENTS

Figure 1:
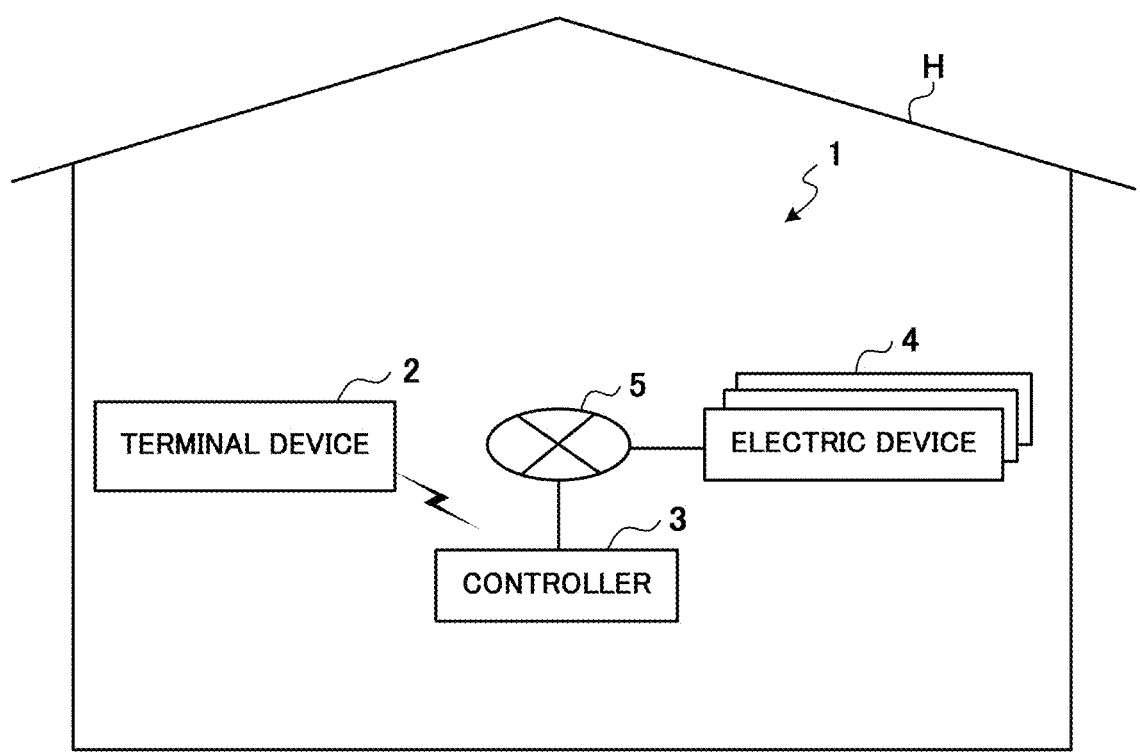
FIG. 1 is a schematic diagram illustrating an example of an overall configuration of a layout generation system according to an embodiment of the present disclosure.

Hereinafter, embodiments of the present disclosure are described in detail and with reference to the drawings. In the drawings, the same reference signs are used to denote the same or corresponding parts. Note that in practice, the present disclosure is used as one function in an energy management system that manages electric devices positioned in a home. The energy management system monitors the amount of power of each electric device via a network, and also controls operation of each electric device via the network. In such an energy management system, the present disclosure is applied in order to generate layout information for the electric devices. Even so, in order to more clearly indicate the features of the present disclosure, hereinafter the present disclosure is described by way of practical examples of a layout generation system. In other words, the practical examples of a layout generation system described hereinafter is similarly applicable to an energy management system that manages electric devices connected to a network in a home.

FIG. 1 is a schematic diagram illustrating an example of an overall configuration of a layout generation system 1 according to an embodiment of the present disclosure. The layout generation system 1 is a system in which a user operates a terminal device 2 to generate layout information for electric devices 4 installed in each room of a home H. The layout generation system 1 is equipped with the terminal device 2, a controller 3, and multiple electric devices 4. Of these, the controller 3 and each electric device 4 are communicably connected via a home network 5, while the terminal device 2 and the controller 3 are communicably connected by a wireless LAN or the like. Note that the home H is provided with multiple rooms, and the electric devices 4 are freely-installed in the rooms.

Figure 2:
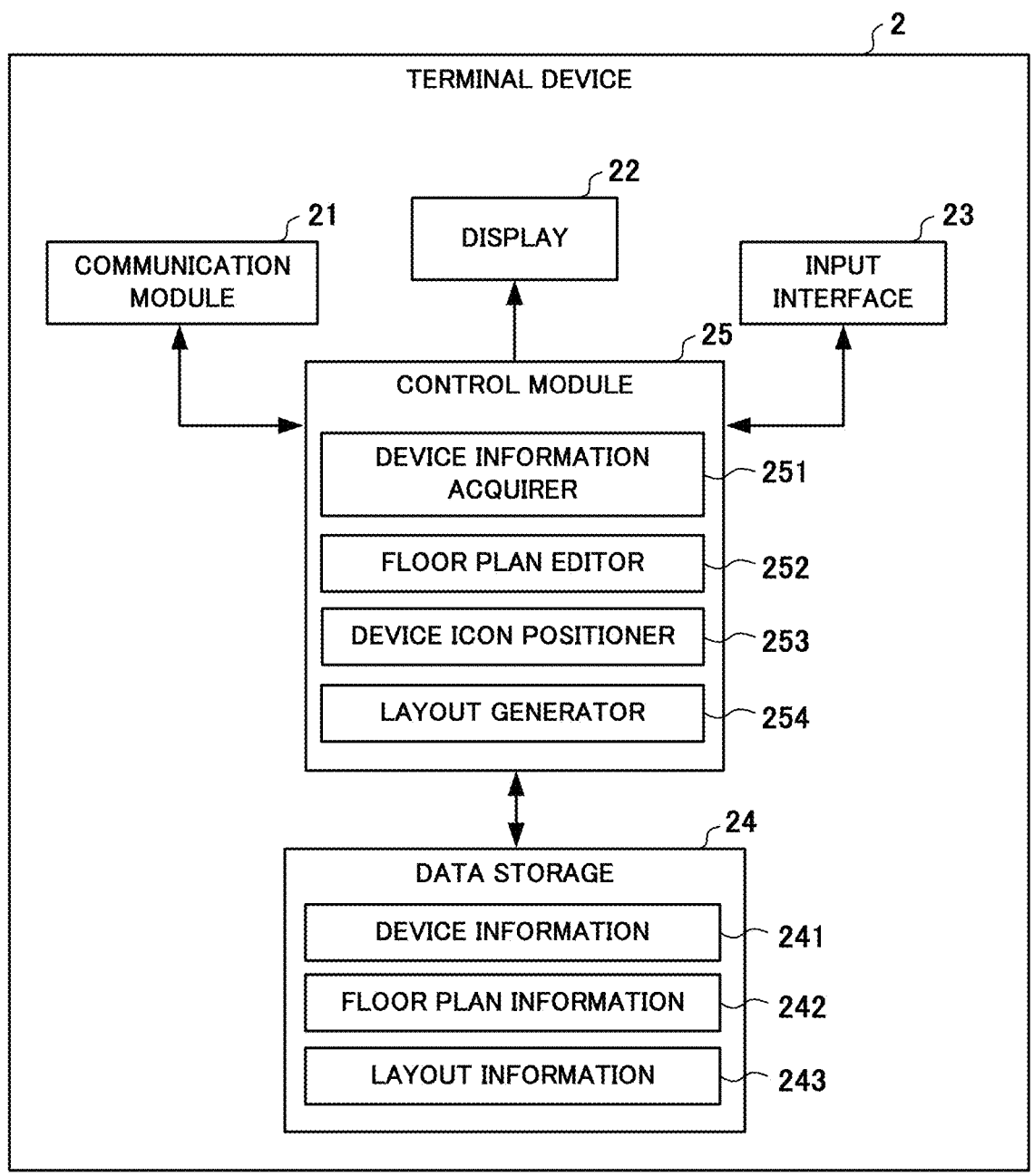
FIG. 2 is a block diagram illustrating an example of a configuration of a terminal device.

The terminal device 2 is a mobile terminal such as a tablet or a smartphone, for example, and is used by the user. An example of the configuration of the terminal device 2 is described below with reference to the block diagram in FIG. 2. As illustrated in FIG. 2, the terminal device 2 is equipped with a communication module 21, a display 22, an input interface 23, data storage 24, and a control module 25.

The communication module 21 is equipped with an interface that complies with the Wi-Fi (registered trademark) standard for a wireless LAN connection, for example, and conducts data communication with the controller 3 under control by the control module 25.

Figure 3:
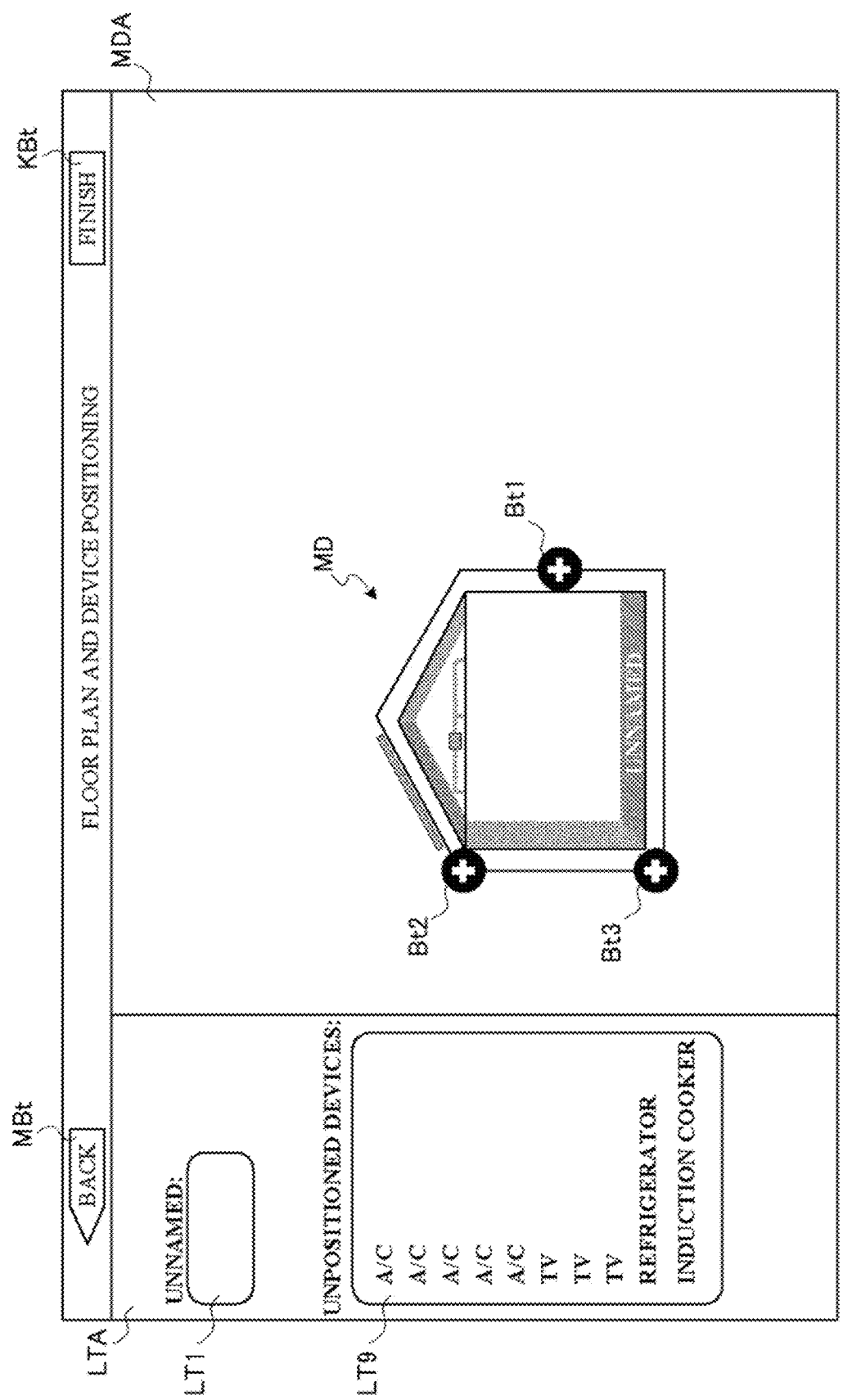
FIG. 3 is a schematic diagram illustrating an example of an editing screen.

The display 22 is equipped with a liquid crystal panel or the like, and displays various screens or the like under control by the control module 25. Specifically, the display 22 displays an editing screen as illustrated in FIG. 3, for example. The editing screen is a screen for configuring a floor plan and device positioning (that is, editing the floor plan and positioning icons in each room), and is provided with a floor plan area MDA and a list area LTA. First, in the floor plan area MDA, a floor plan image MD is displayed as illustrated in the drawings. Note that the floor plan image MD is an example of an initial state, and illustrates a state in which the rooms are not configured, and all devices (icons) are not positioned. In the floor plan image MD, buttons Bt1 to Bt3 for specifying the addition of a room or the like are disposed. Note that these buttons Bt1 to Bt3 are described in detail together with the control module 25 (a floor plan editor 252) discussed later. Also, in the list area LTA, lists LT1 and LT9 of the name or the like of a room added to (configured in) the floor plan image MD and the devices positioned in that room are displayed. Note that in FIG. 3, since the devices are in an unpositioned state, the room is unnamed, and the list LT1 is blank (no devices are displayed). On the other hand, all devices are displayed on the list LT9 of unpositioned devices. Note that each device on the list LT9 is acquired by a device information acquirer 251 discussed later, and displayed on the basis of device information 241 discussed later, which is stored in the data storage 24. Besides the above, on the editing screen illustrated in FIG. 3, a Back button Mbt and a Finish button KBt are provided. The Back button Mbt is a button for giving an instruction to end processing without applying the edited content, while the Finish button KBt is a button for giving an instruction to end processing after applying the edited content.

Returning to FIG. 2, the input interface 23 is made up of a touchscreen, touch pad, and/or the like, and conducts a process of receiving operating input from the user. For example, in the case of adopting a touchscreen as the input interface 23, a transparent planar capacitive sensor that detects changes in electrostatic capacitance is mounted overlaid onto a liquid crystal display panel. When the capacitive sensor detects contact (pressure) on the touch surface (from the user's perspective, the display screen of the liquid crystal display panel) by the user's finger or a dedicated stylus, information about the position (coordinate data) is output to the control module 25. The control module 25 determines the user operation content on the basis of the position information. When the user performs an input operation via the input interface 23, a signal corresponding to the operation content is output to the control module 25.

The data storage 24 assumes the role of what is called a secondary storage device (auxiliary storage device), and is made up of readable and writable non-volatile semiconductor memory such as flash memory, for example. The data storage 24 stores the device information 241, floor plan information 242, and layout information 243 described below. Besides the above, the data storage 24 also stores programs and the like executed by the control module 25.

First, the device information 241 is described with reference to FIG. 4. FIG. 4 is a partial table illustrating an example of the device information 241. The device information 241 is device information related to each electric device 4, and is acquired from the controller 3 by the control module 25 (more specifically, the device information acquirer 251 discussed later). As illustrated in FIG. 4, information such as a device identification number, a device type, a serial number, and a power rating is stored in the device information 241.

Next, the floor plan information 242 is described with reference to FIG. 5. FIG. 5 is a partial table illustrating an example of the floor plan information 242. Note that the floor plan information 242 is generated after floor plan editing by the control module 25 (more specifically, the floor plan editor 252 discussed later) finishes. In the state in which floor plan editing has not been conducted, the floor plan information 242 is all blank data. As illustrated in FIG. 5, information such as a room identification number, the floor where a room is located, and the name of the room is stored in the floor plan information 242. In other words, the floor plan information 242 reflects the results of floor plan editing by the floor plan editor 252 discussed later, and this data is stored therein.

Finally, the layout information 243 is described with reference to FIG. 6. FIG. 6 is a partial table illustrating an example of the layout information 243. Note that the layout information 243 is generated after the positioning of devices (icons) in each room by the control module 25 (more specifically, a device icon positioner 253 discussed later) finishes. In the state in which device positioning has not been conducted, the layout information 243 is all blank data. As illustrated in FIG. 6, information such as the device identification number, the room identification number, and the device name is stored in the layout information 243. In other words, the layout information 243 reflects the results of device positioning by the device icon positioner 253 discussed later, and this data is stored therein.

Returning to FIG. 2, the control module 25 is equipped with a central processing unit (CPU), read-only memory (ROM), random access memory (RAM), and the like (none of which are illustrated), and controls the components discussed above. Functionally, the control module 25 is equipped with the device information acquirer 251, the floor plan editor 252, the device icon positioner 253, and a layout generator 254. The functions of these structural elements are realized by the CPU using the RAM as working memory to appropriately execute various programs stored in the ROM or the data storage 24.

The device information acquirer 251 acquires, through the communication module 21, device information about each electric device 4 collected by the controller 3. In other words, when an electric device 4 is connected to the home network 5, the device information acquirer 251 acquires, through the communication module 21, device information collected by the controller 3 (more specifically, the device information collector 331 discussed later). Note that the device information acquirer 251 acquires device information before the processing by the floor plan editor 252 and the like, for example, and causes the data storage 24 to store the acquired device information as the device information 241 discussed above.

The floor plan editor 252 edits a simplified floor plan of the home H by individually adding the configurations of rooms in which an actual electric device 4 is installed, according to user operations. More specifically, the floor plan editor 252 edits the floor plan according to operations on the input interface 23 (as an example, operations on a touchscreen) while in a state of displaying on the display 22 an editing screen like the one illustrated in FIG. 3 discussed above. Next, the buttons Bt1 to Bt3 provided in the floor plan image MD on the editing screen in FIG. 3 are described. The button Bt1 is a button for giving an instruction to add a room. When a press of the button Bt1 (touch by the user) is detected via the input interface 23, the floor plan editor 252 re-generates and displays on the display 22 the floor plan image MD with an added room.

This situation is described specifically with reference to FIGS. 7A to 7C. FIGS. 7A to 7C are schematic diagrams illustrating an example of an editing screen in a case of adding a room. First, as illustrated in FIG. 7A, when the user's finger presses the button Bt1 in the floor plan image MD, the floor plan editor 252 generates and displays on the display 22 a popup dialog DA1 prompting the user to register a room name, as illustrated in FIG. 7B. The dialog DA1 herein illustrates a case in which the user has selected "Living room" as the name of the room. Subsequently, the floor plan editor 252 generates and displays in the floor plan area MDA the floor plan image MD with an added "Living room", as illustrated in FIG. 7C. Also, the floor plan editor 252 adds "Living room" and a corresponding list LT2 (blank) to the list area LTA. In this way, the floor plan editor 252 adds a room to the floor according to the press of the button Bt1. At this point, as the number of rooms increases, the horizontal width of the floor plan image MD is extended appropriately.

Next, the button Bt2 is a button for giving an instruction for adding an upper floor (such as the second floor), and the button Bt3 is a button for giving an instruction to add a lower floor (such as the first basement floor). When a press of one of these buttons Bt2 and Bt3 is detected via the input interface 23, the floor plan editor 252 re-generates and displays on the display 22 the floor plan image MD with an added floor (upper floor or lower floor). Note that the floor plan editor 252 generates the floor plan image MD according to presses of these buttons Bt2 and Bt3 up to the limits of a first basement floor and a third floor above ground, for example. Note that these limits are an example, and may be changed appropriately according to factors such as the resolution of the display 22.

In this way, the user individually adds the configurations of rooms in which an actual electric device 4 is installed, and edits the simplified floor plan of the home H. Note that at this point, supposing that an added room or floor becomes unwanted (such as when added by mistake, for example), the user may perform a predetermined operation, and the floor plan editor 252 may delete the added room or floor according to the operation.

Returning to FIG. 2, the device icon positioner 253 positions devices (icons) in desired rooms on the floor plan according to user operations. More specifically, while in a state of displaying on the display 22 an editing screen like the one illustrated in FIG. 3 and the like discussed above, the device icon positioner 253 selects a device on the list LT9 (unpositioned device) according to an operation on the input interface 23 (as an example, an operation on a touchscreen), and moves an icon of the device into the floor plan image MD, thereby positioning the icon in a target room (a room in which the actual electric device 4 is installed).

Figure 8A:
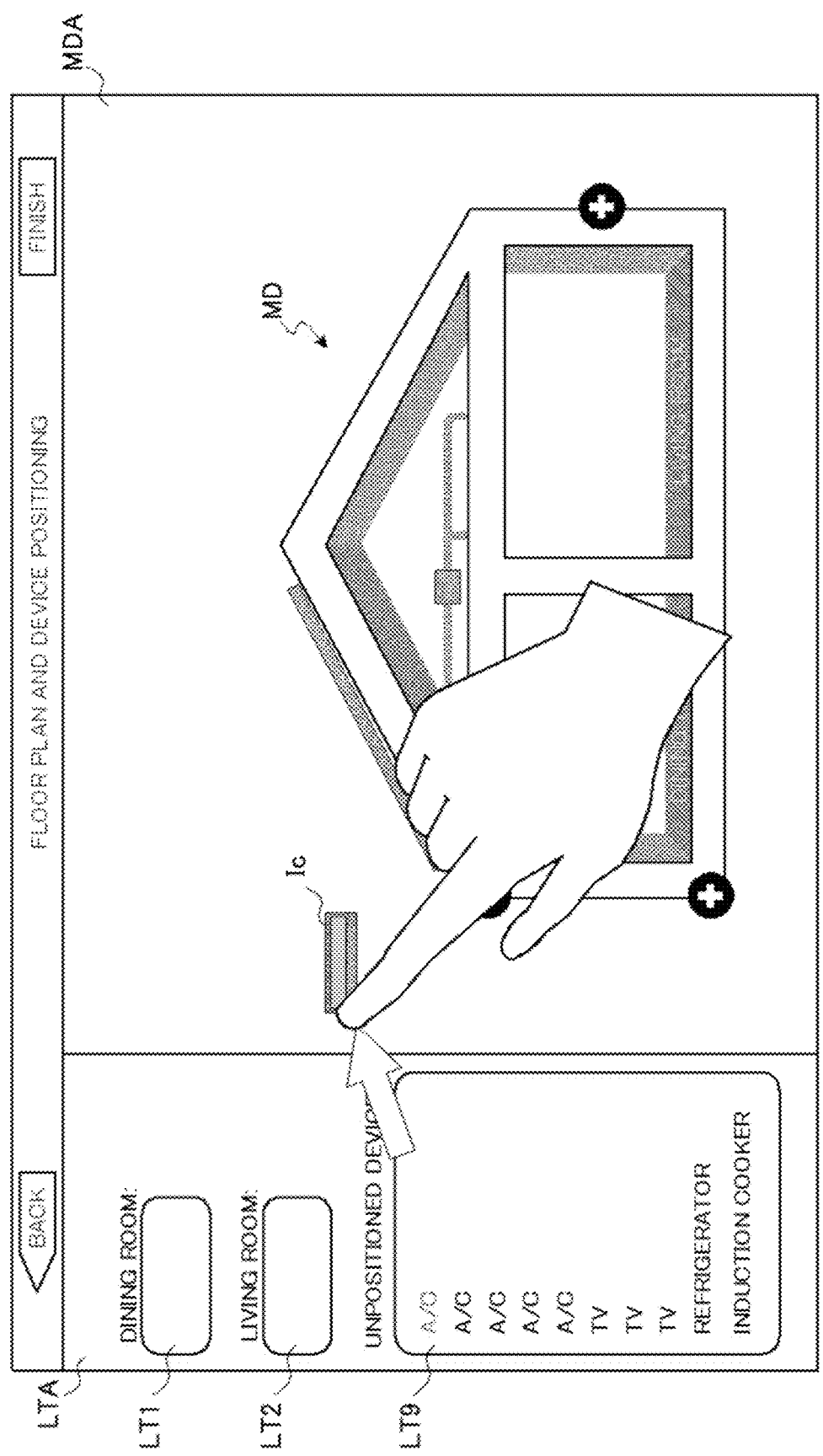
FIG. 8A is a schematic diagram illustrating an example of the editing screen in a case of positioning a device.
Figure 8C:
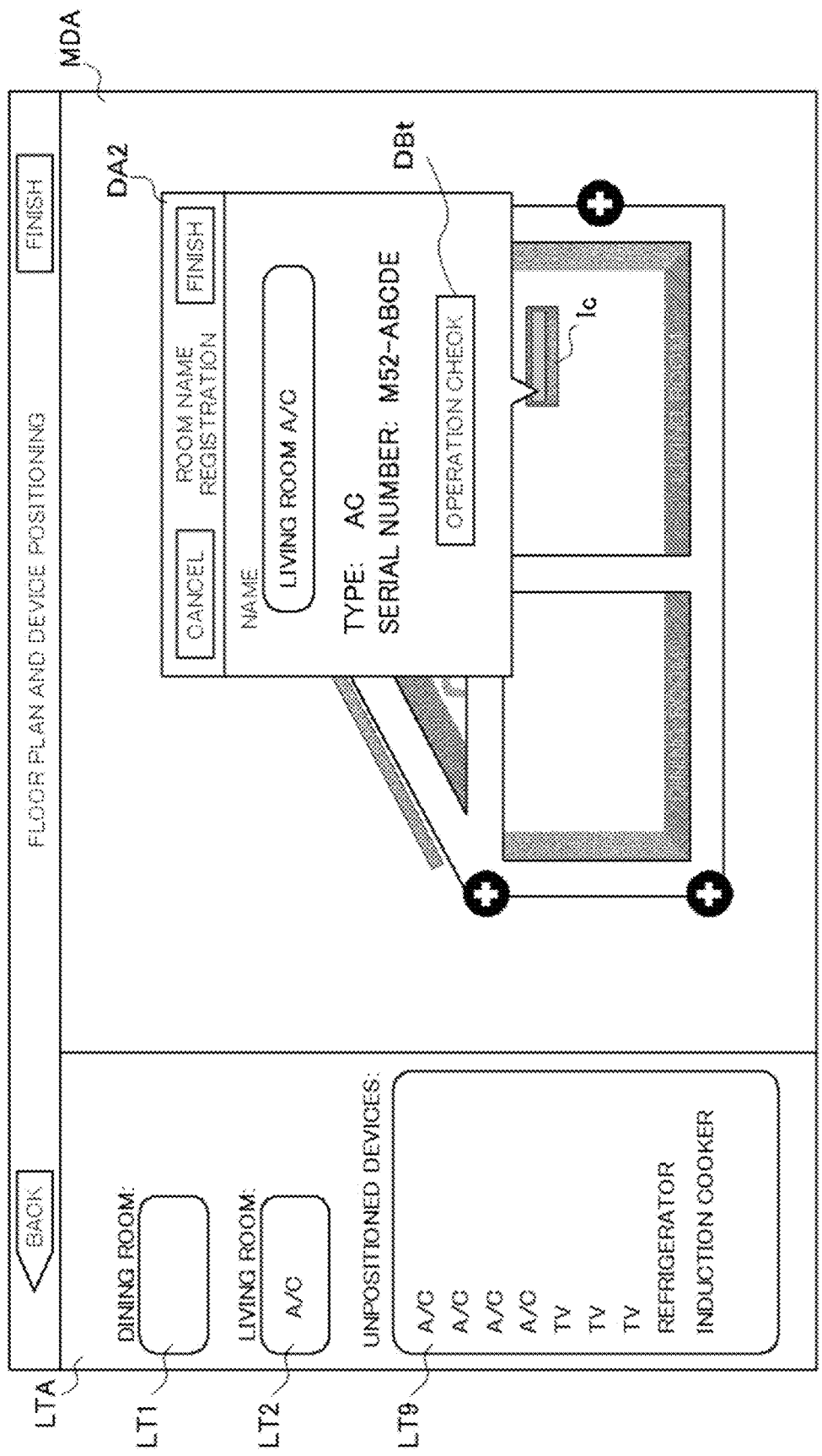
FIG. 8C is a schematic diagram illustrating an example of the editing screen in the case of positioning the device.

This situation is described specifically with reference to FIGS. 8A to 8C. FIGS. 8A to 8C are schematic diagrams illustrating an example of an editing screen in a case of positioning a device. First, as illustrated in FIG. 8A, when the user's finger presses an any device from the list LT9 of unpositioned devices (in this example, the uppermost A/C (air conditioner)), the device icon positioner 253 generates and displays an icon Ic of that device at the pressed location. The icon Ic is controlled by the device icon positioner 253 to move so as to follow a drag operation by the user. Note that if the user's finger is released outside the floor plan image MD (if the drag operation ends outside the floor plan image MD in the floor plan area MDA), the device icon positioner 253 removes the icon Ic, and does not position the device. If the drag operation is maintained, and the icon Ic is moved into the floor plan image MD, the device icon positioner 253 highlights the frame of the room corresponding to the drag destination (in this example, the living room), as illustrated in FIG. 8B. Subsequently, if the user's finger is released (if the icon Ic is dropped) at that location, the device icon positioner 253 positions the icon Ic in that room (in this example, the living room), and also generates and displays on the display 22 a popup dialog DA2 prompting the user to register a device name, as illustrated in FIG. 8C. The dialog DA2 includes a button DBt for giving an instruction to perform an operation check. When the button DBt is pressed, the control module 25 requests, through the communication module 21, the controller 3 to conduct control for a predetermined check operation with respect to the electric device 4 indicated by the icon Ic. Note that the operation check is described in detail together with a control module 33 of the controller 3 discussed later. Also, in conjunction with the positioning of the icon Ic, the device icon positioner 253 displays "A/C" on the living room list LT2 in the list area LTA of FIG. 8C.

Figure 9A:
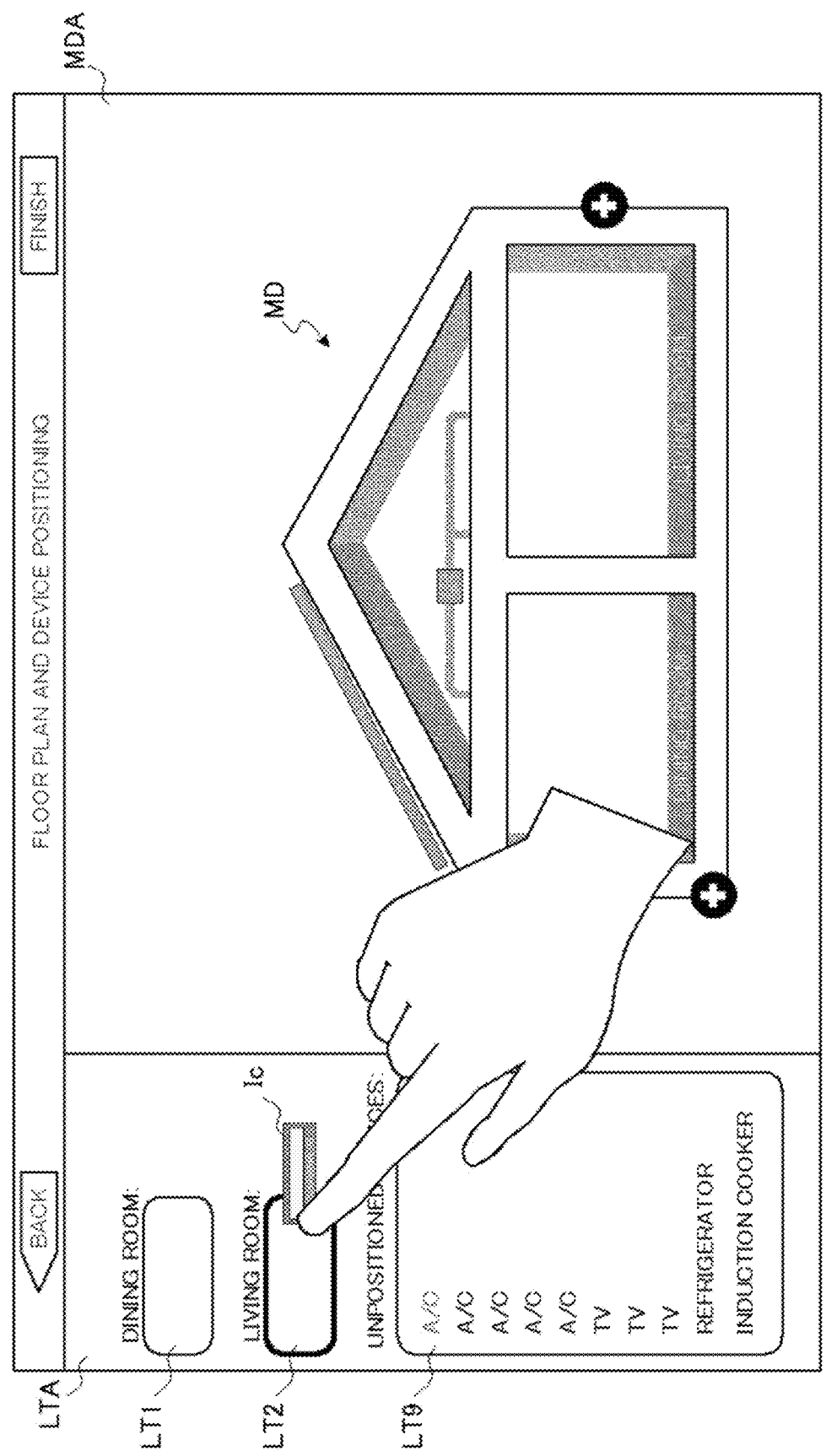
FIG. 9A is a schematic diagram illustrating an example of the editing screen in the case of positioning a device with a drag operation in a list area LTA.
Figure 9B:
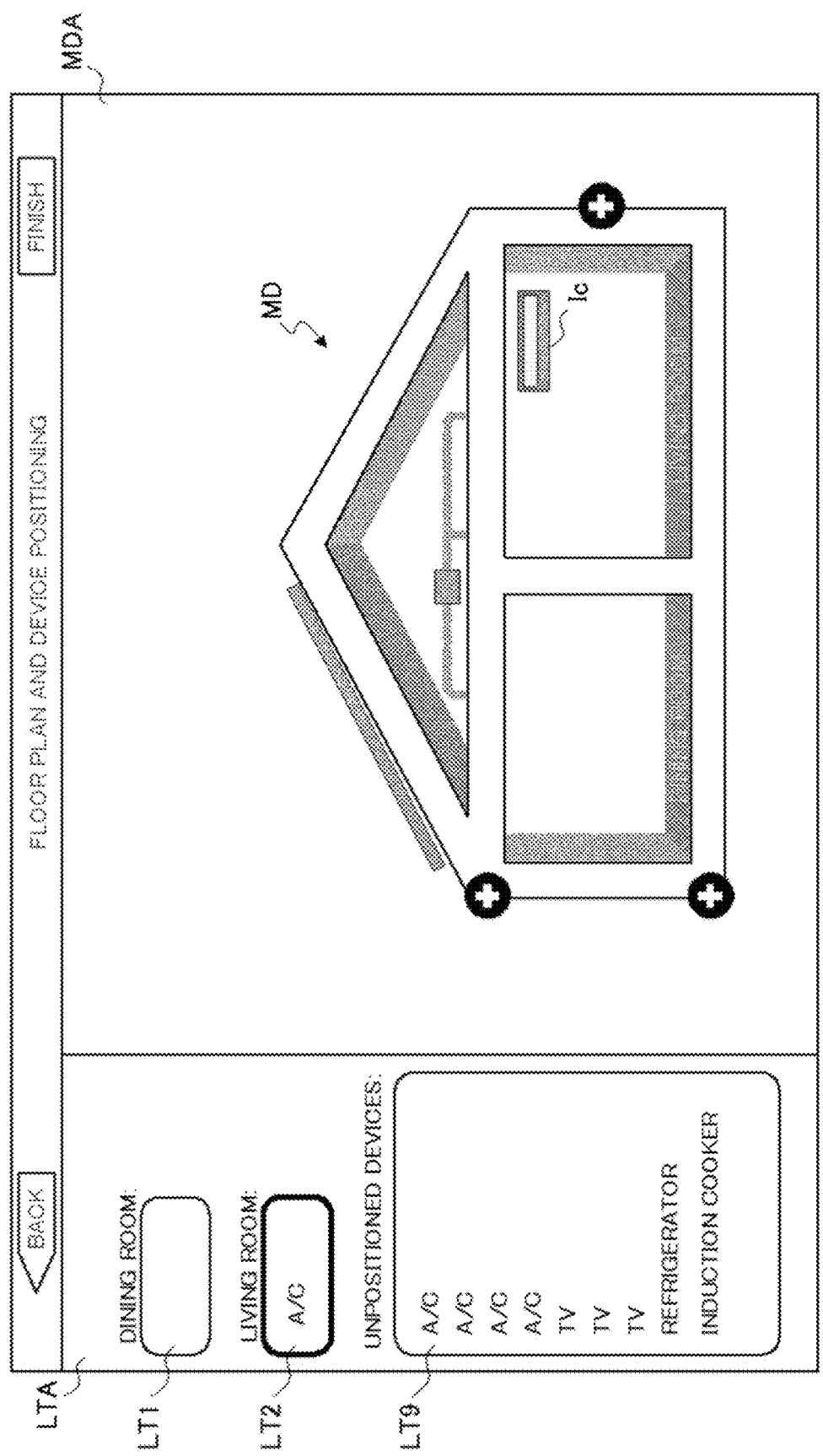
FIG. 9B is a schematic diagram illustrating an example of the editing screen in the case of positioning the device with the drag operation in the list area LTA.

Note that a device may also be positioned in a target room by not only a drag operation (drag and drop) in the floor plan area MDA in this way, but also by a drag operation in the list area LTA. This situation is described specifically with reference to FIGS. 9A and 9B. FIGS. 9A and 9B are schematic diagrams illustrating an example of an editing screen in a case of positioning a device with a drag operation in the list area LTA. First, similarly to the above case of FIG. 8A, when any device is selected from the list LT9 of unpositioned devices and a drag operation is performed, the icon Ic is generated, and moves to follow the user's fingertip. If the drag operation is performed in the list area LTA, and the icon Ic is moved into the list LTn of one of the rooms (in this example, into the living room list LT2), the device icon positioner 253 highlights the frame of the list LT2, as illustrated in FIG. 9A. Subsequently, when the user's finger is released (when the icon Ic is dropped) at that location, the device icon positioner 253 displays "A/C" in the list LT2, and also positions the icon Ic in the corresponding room in the floor plan image MD (in this example, the living room), as illustrated in FIG. 9B. Note that, although omitted from FIG. 9B, the device icon positioner 253 also generates and displays a popup dialog DA2 prompting the user to register a device name, similarly to FIG. 8C discussed above. Note that if the drag operation ends outside the list LTn of one of the rooms in the list area LTA, or if the drag operation ends inside the list LT9 of unpositioned devices, the device icon positioner 253 removes the icon Ic, and does not position the device.

Figure 10A:
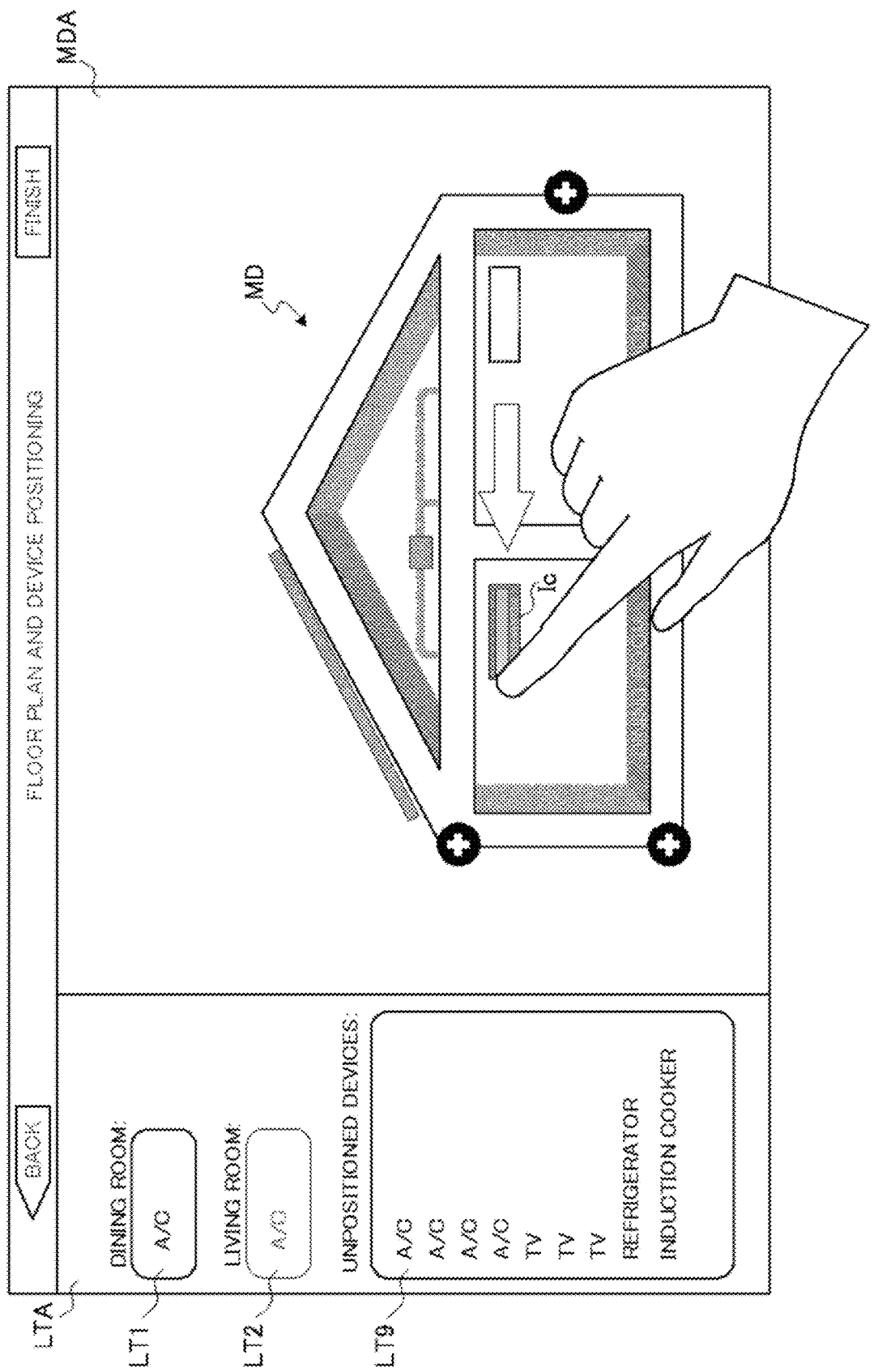
FIG. 10A is a schematic diagram illustrating an example of the editing screen in a case of repositioning an already-positioned device.
Figure 10B:
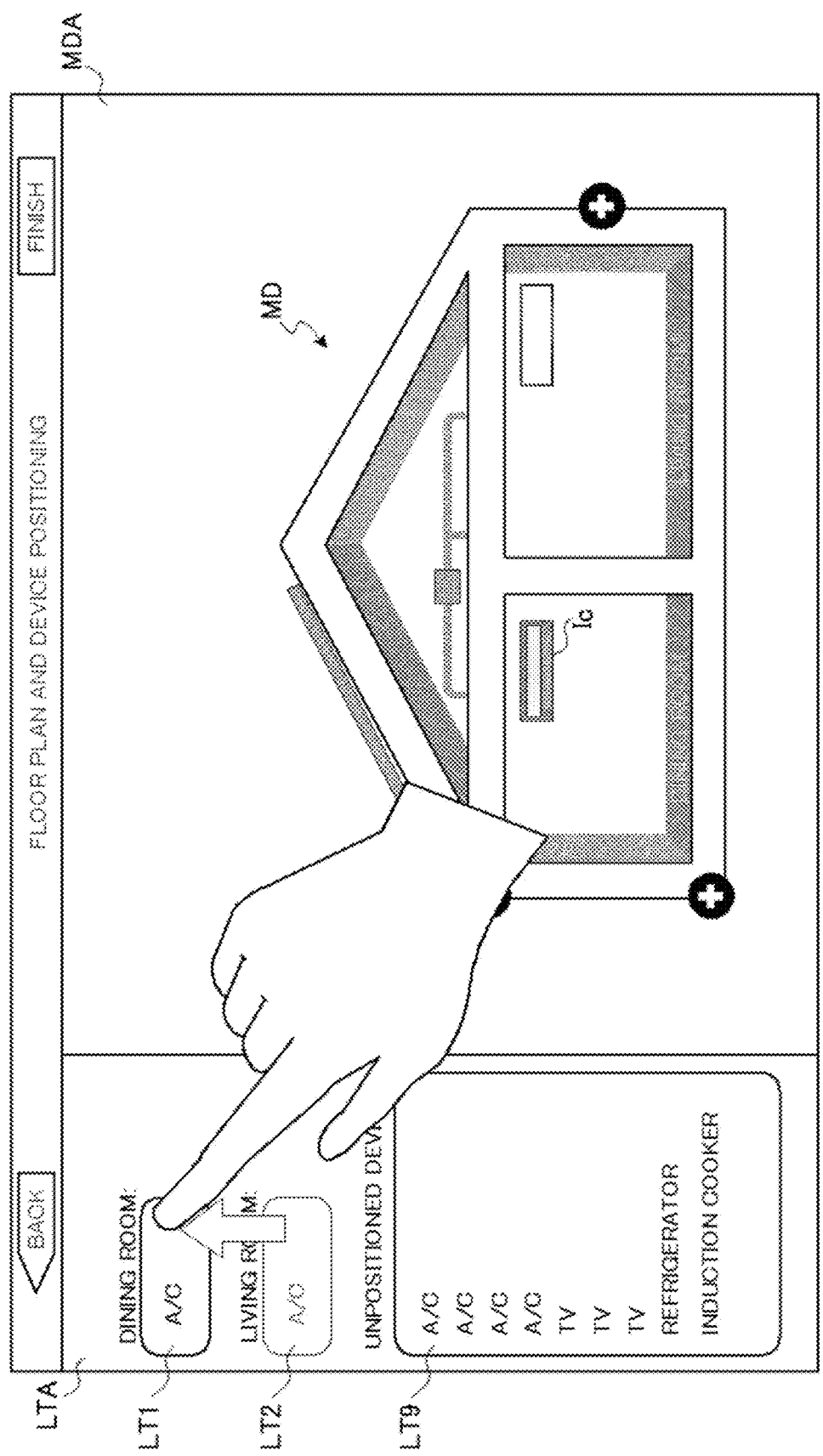
FIG. 10B is a schematic diagram illustrating an example of the editing screen in the case of repositioning the already-positioned device.

Furthermore, it is not only possible to position an unpositioned device in a room in this way, but also to move and reposition a device already positioned in one room to another room. This situation is described specifically with reference to FIGS. 10A and 10B. FIGS. 10A and 10B are schematic diagrams illustrating an example of an editing screen in a case of repositioning an already-positioned device. First, when repositioning a device with a drag operation inside the floor plan image MD, the user performs a drag operation to move and drop an already-positioned icon Ic into another room (in this example, the dining room), as illustrated in FIG. 10A. When the drag operation is received, the device icon positioner 253 positions the icon Ic in the dining room, and in addition, removes "A/C" from the living room list LT2 in the list area LTA, and instead displays "A/C" in the dining room list LT1. Next, when repositioning a device with a drag operation inside the list area LTA, the user performs a drag operation between lists to move a device into another room (in this example, the dining room), as illustrated in FIG. 10B. When the drag operation is received, the device icon positioner 253 removes "A/C" from the living room list LT2 in the list area LTA, and instead displays "A/C" in the dining room list LT1. In addition, the device icon positioner 253 moves and positions the icon Ic from the living room to the dining room in the floor plan image MD.

Figure 11:
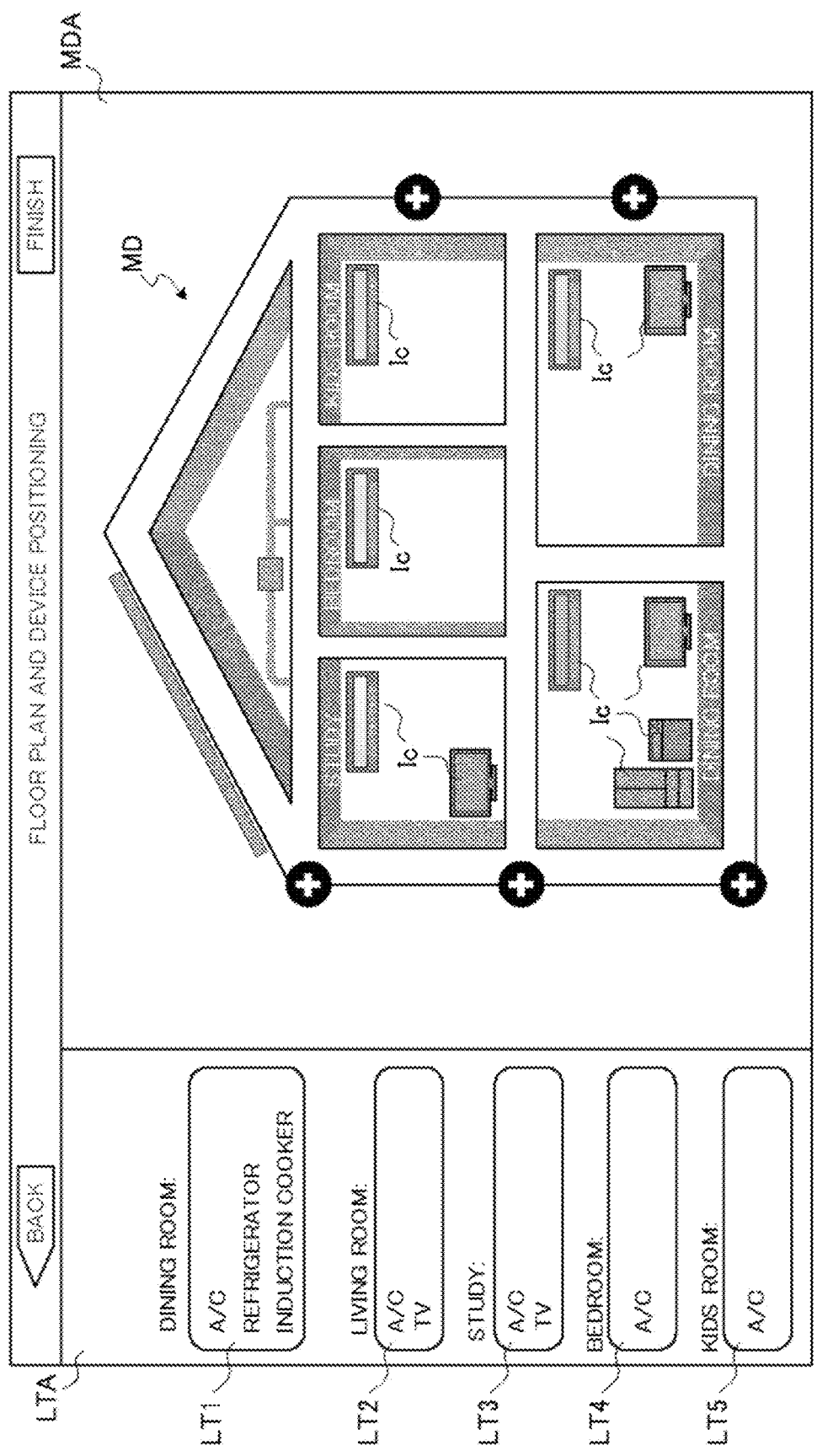
FIG. 11 is a schematic diagram illustrating an example of the editing screen after finishing the floor plan and device positioning.

Returning to FIG. 2, the layout generator 254 generates layout information for the electric devices 4 in the home H, on the basis of the floor plan edited by the floor plan editor 252 discussed above, and the devices (icons of the electric devices 4) positioned by the device icon positioner 253 discussed above. For example, when the user presses the Finish button KBt on the editing screen after the floor plan and device positioning are finished, as illustrated in FIG. 11, the layout generator 254 generates layout information on the basis of the editing screen. In other words, on the editing screen in FIG. 11, the floor plan image MD is made up of only rooms in which an electric device 4 is positioned. Additionally, the icon Ic of each electric device 4 is positioned in each room of the floor plan image MD (the respective rooms in which the electric devices 4 are actually installed). Also, the names of each of the electric devices 4 are displayed in the lists LT1 to LT5 in the list area LTA. When the Finish button KBt is pressed while in this state, on the basis of the editing screen, the layout generator 254 generates and causes the data storage 24 to store layout information 243 as illustrated in FIG. 6 discussed above.

Figure 12:
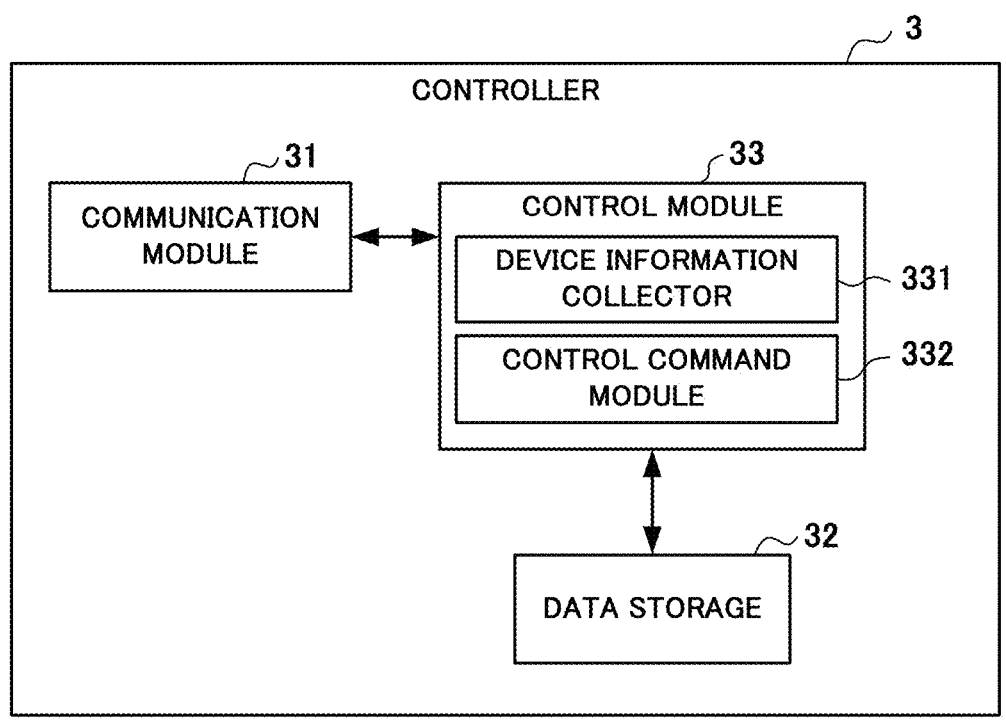
FIG. 12 is a block diagram illustrating an example of a configuration of a controller.

Returning to FIG. 1, the controller 3 manages each electric device 4. An example of the configuration of the controller 3 is described below with reference to the block diagram in FIG. 12. As illustrated in FIG. 12, the controller 3 is equipped with a communication module 31, data storage 32, and the control module 33.

The communication module 31, under control by the control module 33, conducts data communication with the electric devices 4 via the home network 5. In addition, the communication module 31 also includes the functions of an access point for a wireless LAN connection, for example, and conducts data communication with the terminal device 2.

The data storage 32 assumes the role of what is called a secondary storage device (auxiliary storage device), and is made up of readable and writable non-volatile semiconductor memory such as flash memory, for example. The data storage 32 stores information such as device information and operating conditions for each electric device 4. Note that the device information and operating conditions for each electric device 4 may be updated as appropriate by the control module 33 on the basis of information collected from each electric device 4 by the communication module 31, for example. Besides the above, the data storage 32 also stores programs and the like executed by the control module 33.

The control module 33 is equipped with a CPU, ROM, RAM, and the like (none of which are illustrated), and controls the components discussed above. Functionally, the control module 33 is equipped with the device information collector 331 and a control command module 332. The functions of these structural elements are realized by the CPU using the RAM as working memory to appropriately execute various programs stored in the ROM or the data storage 32.

The device information collector 331 collects device information for each electric device 4 through the communication module 31 and the home network 5. For example, the device information collector 331 acquires device information by requesting device information when an electric device 4 connects to the home network 5.

When an operation check for an electric device 4 is requested by the terminal device 2, the control command module 332 commands the relevant electric device 4 to execute a predetermined operation check. For example, the control command module 332 respectively generates power-on and power-off command data corresponding to the electric device 4 for which for an operation check was requested, and then transmits the command data from the communication module 31 via the home network 5 to the relevant electric device 4 to be controlled. Note that the operation check is not limited to power-on/power-off as above, and may be modified as appropriate. For example, for an electric device 4 used in an always-on state, command data commanding the electric device 4 to output a predetermined response sound or the like may be transmitted.

Figure 13:
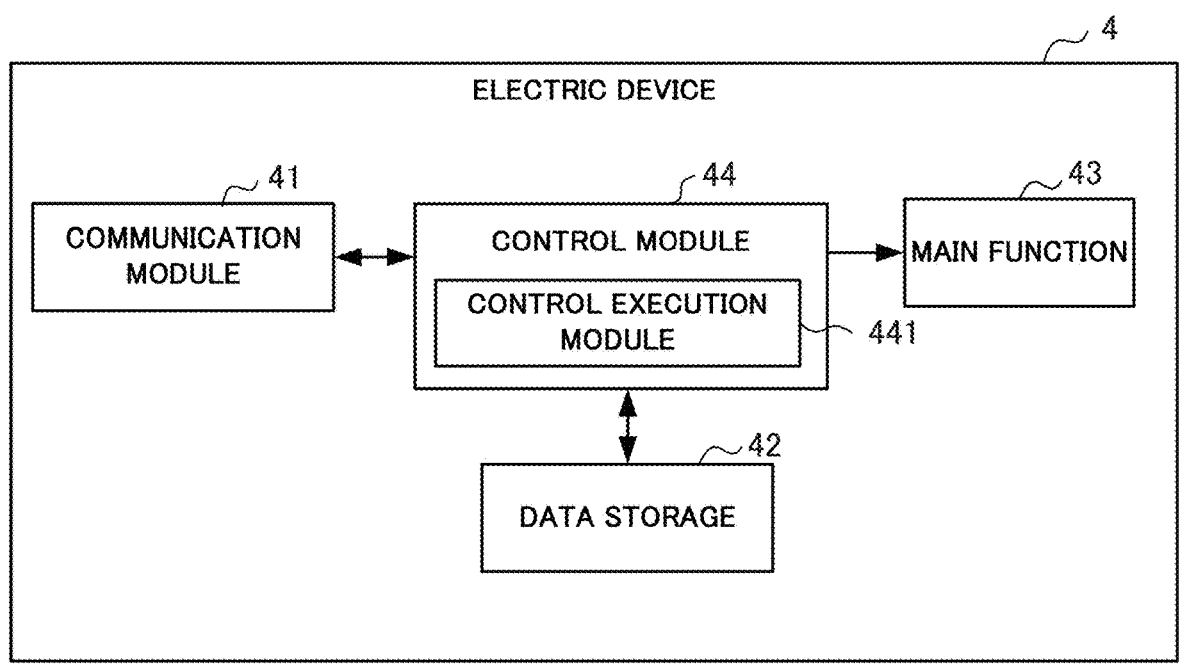
FIG. 13 is a block diagram illustrating an example of a configuration of an electric device.

The electric devices 4 are various electrical appliances used in the home H (such as an air conditioner, TV, refrigerator, and induction cooker, for example), and are installed in respective rooms (such as the dining room, living room, study, bedroom, and kids room, for example). An example of the configuration of such an electric device 4 is described below with reference to the block diagram in FIG. 13. As illustrated in FIG. 13, the electric device 4 is equipped with a communication module 41, a data storage 42, a main function 43, and a control module 44.

The communication module 41 is a communication adapter for connecting to the home network 5, for example, and conducts data communication with the controller 3 via the home network 5 under control by the control module 44. Note that the communication module 41 may also be made up of a removable-attachable external communication adapter.

The data storage 42 assumes the role of what is called a secondary storage device (auxiliary storage device), and is made up of readable and writable non-volatile semiconductor memory such as flash memory, for example. The data storage 42 stores information such as a program executed by the control module 44, and various data.

The main function 43 is a configuration for realizing the original function of the electric device 4 (for example, an air conditioning function in the case of an air conditioner, or a freezing/refrigerating function in the case of a refrigerator), and is controlled by the control module 44.

The control module 44 is equipped with a CPU, RAM, ROM, and the like (none of which are illustrated), and controls the components discussed above. Functionally, the control module 44 is equipped with a control execution module 441. The function of this structural element is realized by the CPU using the RAM as working memory to appropriately execute various programs stored in the ROM or the data storage 42.

The control execution module 441 causes the main function 43 to execute control based on a command from the control command module 332 of the controller 3 discussed earlier. In other words, the control execution module 441 causes the main function 43 to execute a process according to command data (such as a control signal) transmitted from the controller 3.

Figure 14:
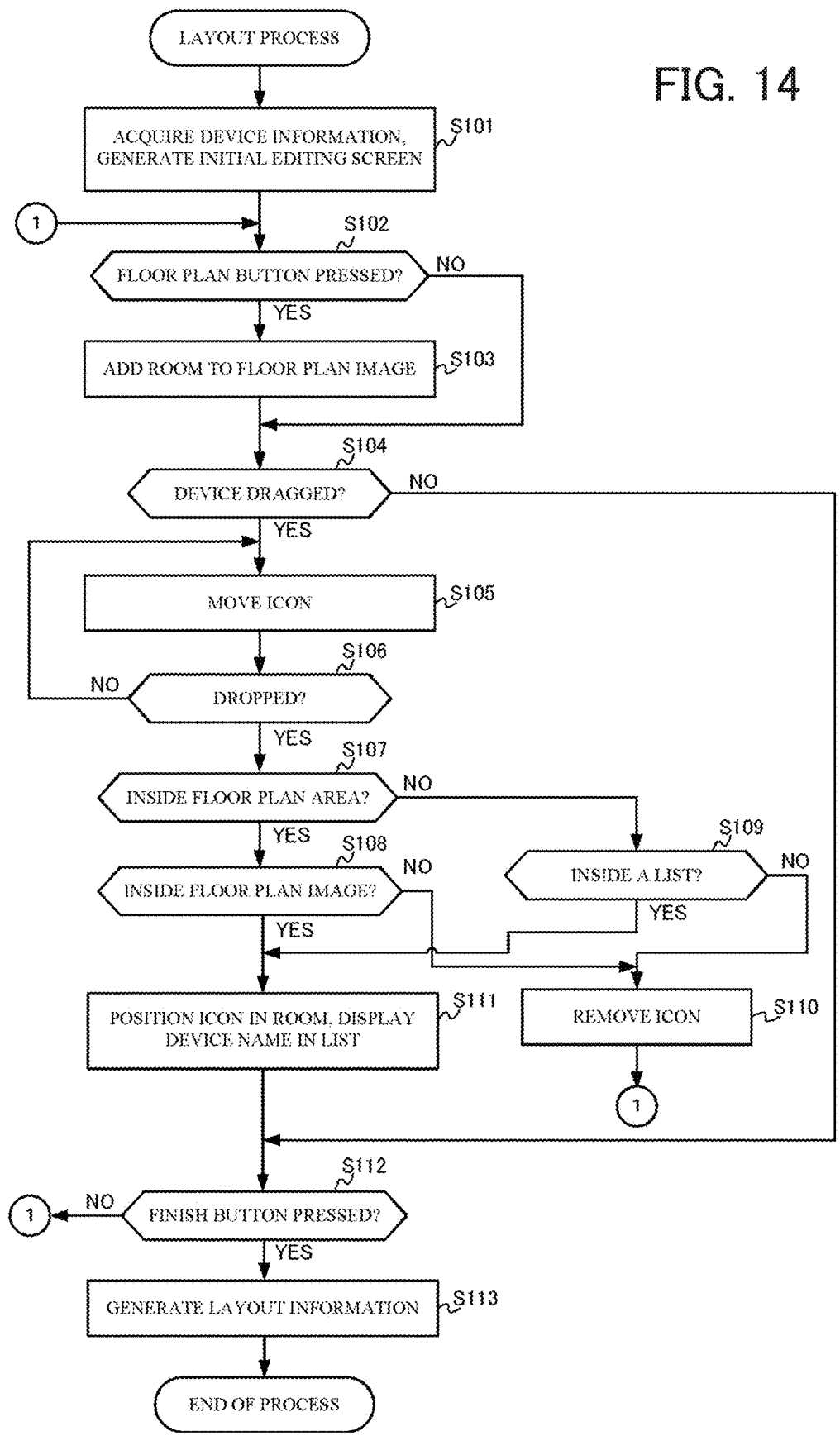
FIG. 14 is a flowchart illustrating an example of a layout process according to an embodiment of the present disclosure.

Next, operation of the layout generation system 1 with the above configuration is described below with reference to FIG. 14. FIG. 14 is a flowchart illustrating an example of a layout process according to an embodiment of the present disclosure, in which layout information for each electric device 4 connected to the home network 5 in the home H, is generated.

First, the terminal device 2 acquires device information, and generates an initial editing screen (step S101). For example, the control module 25 of the terminal device 2 acquires device information related to each electric device 4 from the controller 3 through the communication module 21. Note that the controller 3 collects device information from each electric device 4 in advance via the home network 5, and then transmits the collected device information to the terminal device 2 in response to a request from the terminal device 2, for example. The terminal device 2 stores the acquired device information in the data storage 24 as the device information 241 as illustrated in FIG. 4 discussed earlier. Subsequently, the control module 25 of the terminal device 2 generates an initial editing screen like the one illustrated in FIG. 3 or the like discussed earlier, and displays the initial editing screen on the display 22.

The terminal device 2 determines whether a floor plan button was pressed (step S102). In other words, the control module 25 of the terminal device 2 determines whether the user pressed one of the buttons Bt1 to Bt3 disposed in the floor plan image MD on the editing screen as illustrated in FIG. 3 and the like. If the terminal device 2 determines that the floor plan button was not pressed (step S102; No), processing proceeds to step S104 discussed later.

On the other hand, in the case of determining that the floor plan button was pressed (step S102; Yes), the terminal device 2 adds a room to the floor plan image on the editing screen (step S103). For example, as illustrated in FIG. 7A discussed earlier, when the button Bt1 for giving an instruction to add a room is pressed, the control module 25 of the terminal device 2 displays the dialog DA1 as in FIG. 7B, and then re-generates and displays on the display 22 the floor plan image MD with an added room as in FIG. 7C.

The terminal device 2 determines whether a device was dragged (step S104). In other words, the control module 25 of the terminal device 2 determines whether the user performed a drag operation specifying any device from the list LT9 of unpositioned devices in the list area LTA as illustrated in FIG. 3 and the like. If the terminal device 2 determines that a device was not dragged (step S104; No), processing proceeds to step S112 discussed later.

On the other hand, in the case of determining that a device was dragged (step S104; Yes), the terminal device 2 moves the icon (step S105). For example, when a drag is performed by the user's finger as in FIG. 8A and the like discussed earlier, the control module 25 of the terminal device 2 moves the icon Ic so as to track the user's finger (pressed location).

The terminal device 2 determines whether a drop was performed (step S106). In other words, the control module 25 of the terminal device 2 determines whether the user's finger was released. If the terminal device 2 determines that a drop was not performed (step S106; No), processing returns to step S105.

On the other hand, in the case of determining that a drop was performed (step S106; Yes), the terminal device 2 determines whether the drop location is inside the floor plan area MDA (step S107). In other words, the control module 25 of the terminal device 2 determines whether the icon Ic was dropped inside the floor plan area MDA or inside the list area LTA.

If the terminal device 2 determines that the drop location is inside the floor plan area MDA (step S107; Yes), the terminal device 2 additionally determines whether the drop location is inside the floor plan image MD (step S108). If the terminal device 2 determines that the drop location was not inside the floor plan image MD (step S108; No), processing proceeds to step S110 discussed later.

Meanwhile, in the above step S107, if the terminal device 2 determines that the drop location is not inside the floor plan area MDA, or in other words inside the list area LTA (step S107; No), the terminal device 2 additionally determines whether the drop location is inside a list (step S109). If the terminal device 2 determines that the drop location was not inside any list (step S109; No), the terminal device 2 removes the icon Ic (step S110). Note that the terminal device 2 also removes the icon Ic in the above step S108 when the drop location was not inside the floor plan image MD. Subsequently, the terminal device 2 returns to the above step S102.

On the other hand, if the drop location is determined to be inside the floor plan image MD in the above step S108 (step S108; Yes), or if the drop location is determined to be inside a list in the above step S109 (step S109; Yes), the terminal device 2 positions the icon Ic in a room, and displays the device name in the list (step S111). For example, as illustrated in the FIG. 8B discussed earlier, if the icon Ic is dropped into the floor plan image MD, the control module 25 of the terminal device 2 displays the dialog DA2 and also positions the icon Ic into that room (in this example, the living room), and in addition, displays "A/C" in the living room list LT2 in the list area LTA, as illustrated in FIG. 8C discussed earlier. As yet another example, as illustrated in FIG. 9A discussed earlier, if the icon Ic is dropped into a list (in this example, the living room list LT2), the terminal device 2 positions the icon Ic in the corresponding room of the floor plan image MD (in this example, the living room), and in addition, displays "A/C" in the living room list LT2.

The terminal device 2 determines whether the Finish button for giving an instruction to close the editing screen was pressed (step S112). For example, the control module 25 of the terminal device 2 determines whether the user pressed the Finish button Kbt on the editing screen in FIG. 11 discussed earlier. If the terminal device 2 determines that the Finish button was not pressed (step S112; No), processing returns to step S102, and the above steps S102 to S112 are repeated.

On the other hand, in the case of determining that the Finish button was pressed (step S112; Yes), the terminal device 2 generates layout information (step S113). For example, when the Finish button KBt on the editing screen in FIG. 11 is pressed, the control module 25 of the terminal device 2 generates layout information 243 like that illustrated in FIG. 6 discussed earlier on the basis of the editing screen, and causes the data storage 24 to store the layout information 243.

As described above, according to the layout generation system 1 in accordance with an embodiment of the present disclosure, simple user operations are used to edit a floor plan image MD made up of only rooms in which electric devices 4 are actually installed. Additionally, simple drag operations are used to respectively position the icon Ic of each electric device 4 in each room of the floor plan image MD (the respective rooms in which the electric devices 4 are actually installed), and on the basis thereof, layout information is generated. Note that in the system of Patent Literature 1 discussed earlier, a floor plan image generated from floor plan data or the like also includes rooms and the like in which a device is not installed, and although the generated floor plan image is the same as the actual floor plan, the floor plan image is not simplified, and thus appears complicated to the user. In addition, in the system of Patent Literature 1, a multi-story home (in the example of Patent Literature 1, a two-story home) requires switching of the display between a different floor plan image for each floor. For this reason, operation naturally becomes complicated, and it is also not possible to perceive the entire home at a glance.

In contrast, according to the layout generation system 1 in accordance with an embodiment of the present disclosure, a simplified floor plan image MD made up of the relevant rooms in which electric devices 4 are actually installed is edited. In addition, even a multi-story home H is easily combined into a single floor plan image MD by simplification. Because of the above, in the layout generation system 1, complexity like in the system of Patent Literature 1 is resolved. As a result, layout information is easily generatable for electric devices 4 connected to a network in the home H.

Note that the present disclosure is not limited to the foregoing embodiment, and that various amendments are obviously possible without departing from the spirit of the present disclosure.

The foregoing embodiment describes an example in which, when adding a room to a floor plan image, the control module 25 of the terminal device 2 (more specifically, the floor plan editor 252) makes the rooms uniform with approximately the same size determined by factors such as the number of rooms. However, the sizes of rooms may also be increased or decreased according to differences in the device information of icons (electric devices 4) positioned in the rooms. For example, the sizes of rooms may also be increased or decreased according to the power rating of a specific device in the device information 241 illustrated in FIG. 4 discussed earlier. More specifically, among the electric devices 4, for air conditioners, one having a power rating corresponding to the size of the room of installation is used in many cases. For this reason, after an icon corresponding to an air conditioner is positioned in each room, the floor plan editor 252 increases or decreases the size of the rooms according to the power rating of the air conditioners. As yet another example, the sizes of rooms may also be increased or decreased according to the numbers of icons positioned in the rooms.

Hereinafter, a specific example of increasing and decreasing the sizes or rooms according to the numbers of icons positioned in the rooms is described with reference to FIGS. 15A to 15F. Note that although the following describes the case of dragging icons into the floor plan image MD (drag and drop), as discussed earlier, the case of dragging icons into the list area LTA (a freely-selected list LTn) is also similar.

Figure 15A:
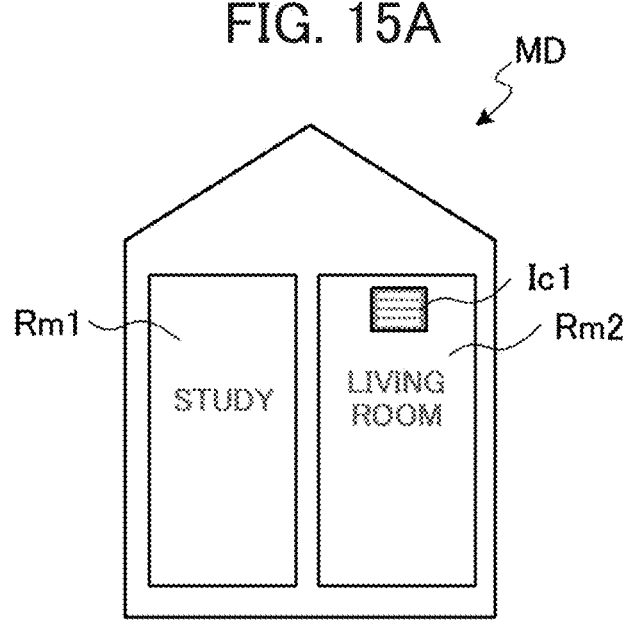
FIG. 15A is a schematic diagram for explaining how the size of a room is increased or decreased.
Figure 15B:
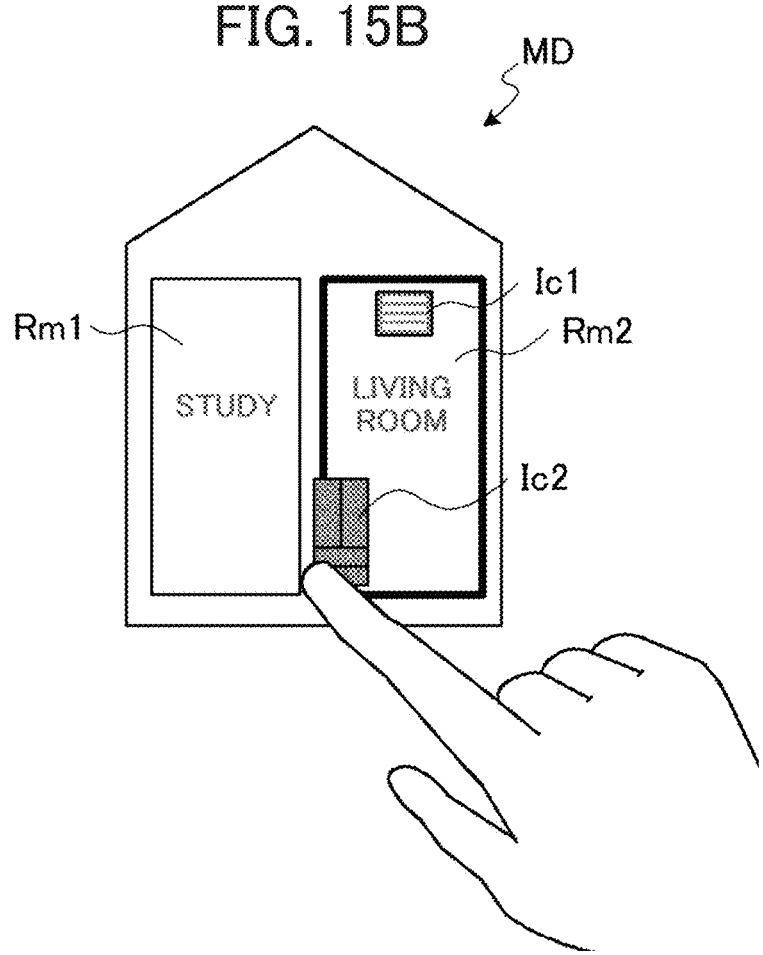
FIG. 15B is a schematic diagram for explaining how the size of the room is increased or decreased.
Figure 15C:
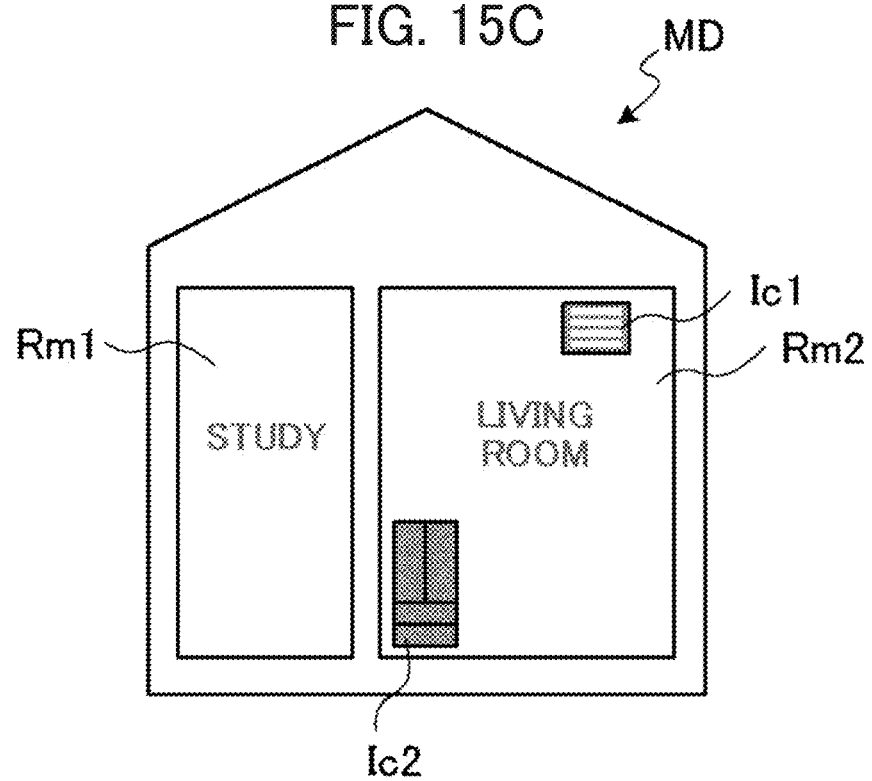
FIG. 15C is a schematic diagram for explaining how the size of the room is increased or decreased.

As illustrated in FIG. 15A, two rooms (rooms Rm1 and Rm2) are provided in the floor plan image MD, and the state in which an icon Ic1 is positioned in only the room Rm2 is described as a start point. In this state, the size of the room Rm2 is the same size as the room Rm1 (initial size) in which no icons are positioned. Subsequently, as illustrated in FIG. 15B, when the user drags and drops an icon Ic2 into the room Rm2, the floor plan editor 252 appropriately increases the size of the room Rm2 according to the icon Ic2, as illustrated in FIG. 15C. For example, the floor plan editor 252 increases the width of the room Rm2 according to factors such as the size of the newly positioned icon Ic2. Note that the floor plan editor 252 may also increase the size of the room Rm2 according to a fixed size or ratio, irrespective of the type of icon.

Figure 15D:
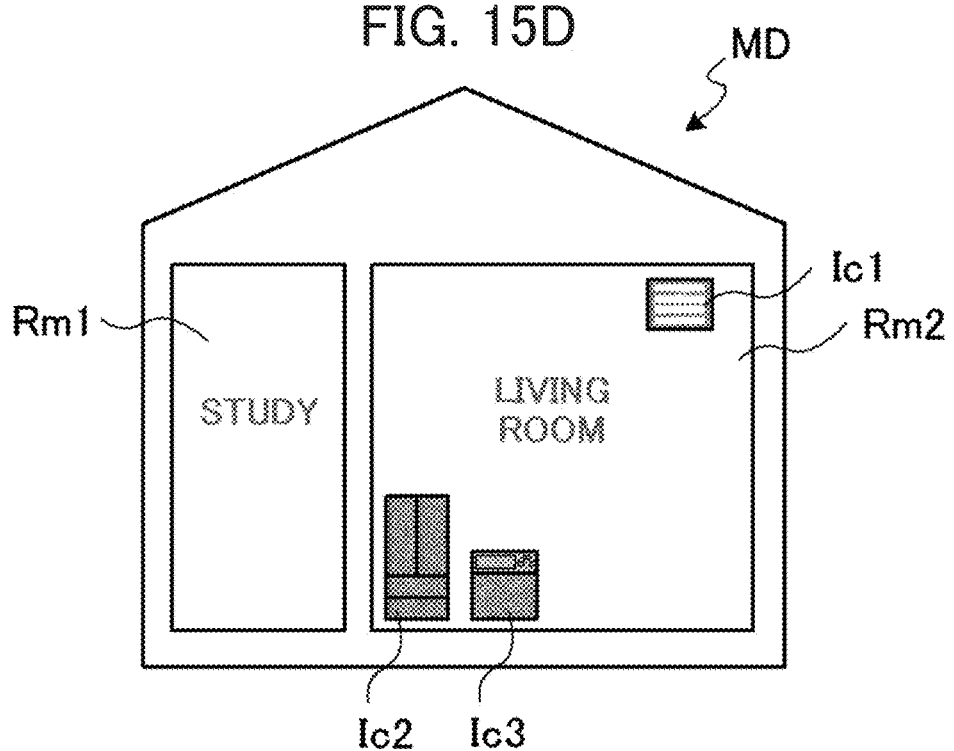
FIG. 15D is a schematic diagram for explaining how the size of the room is increased or decreased.

Similarly, when a new icon is positioned in the room Rm2, the floor plan editor 252 increases the size of the room Rm2. For example, as illustrated in FIG. 15D, the floor plan editor 252 appropriately increases the size of the room Rm2 according to the newly positioned icon Ic3. Conversely, the floor plan editor 252 decreases the size of the room when a positioned icon is moved or deleted. For example, when the icon Ic3 is removed from the room Rm2 illustrated in FIG. 15D, the floor plan editor 252 appropriately decreases the size of the room Rm2, as illustrated in FIG. 15C above. In other words, the floor plan editor 252 re-computes the width of the room Rm2 according to the remaining icons Ic1 and Ic2, and in this case, reverts to the width before the icon Ic3 was positioned.

Figure 15E:
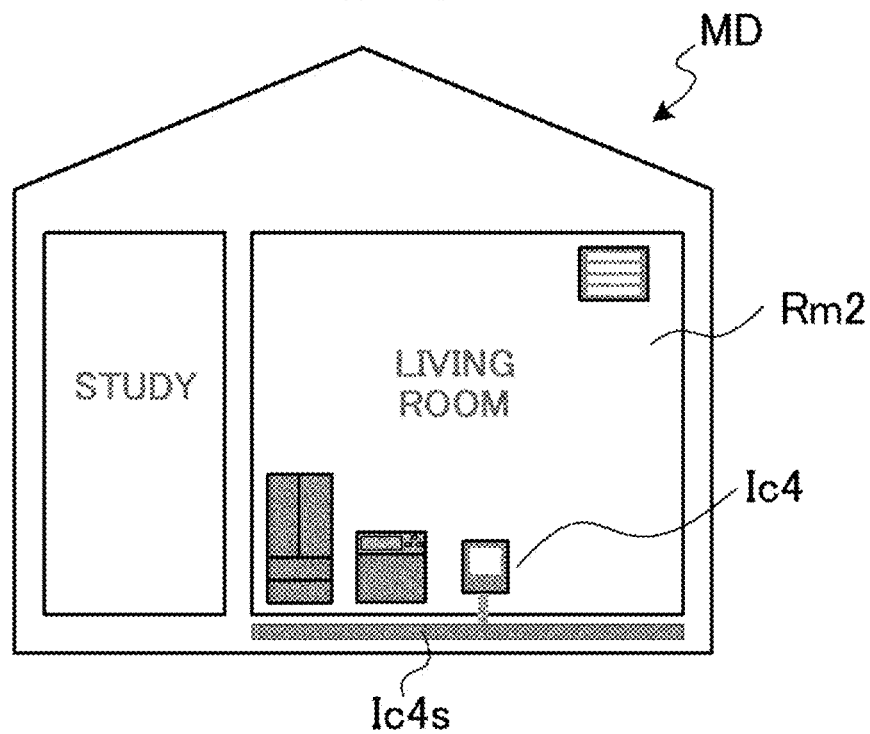
FIG. 15E is a schematic diagram for explaining how the size of the room is increased or decreased.
Figure 15F:
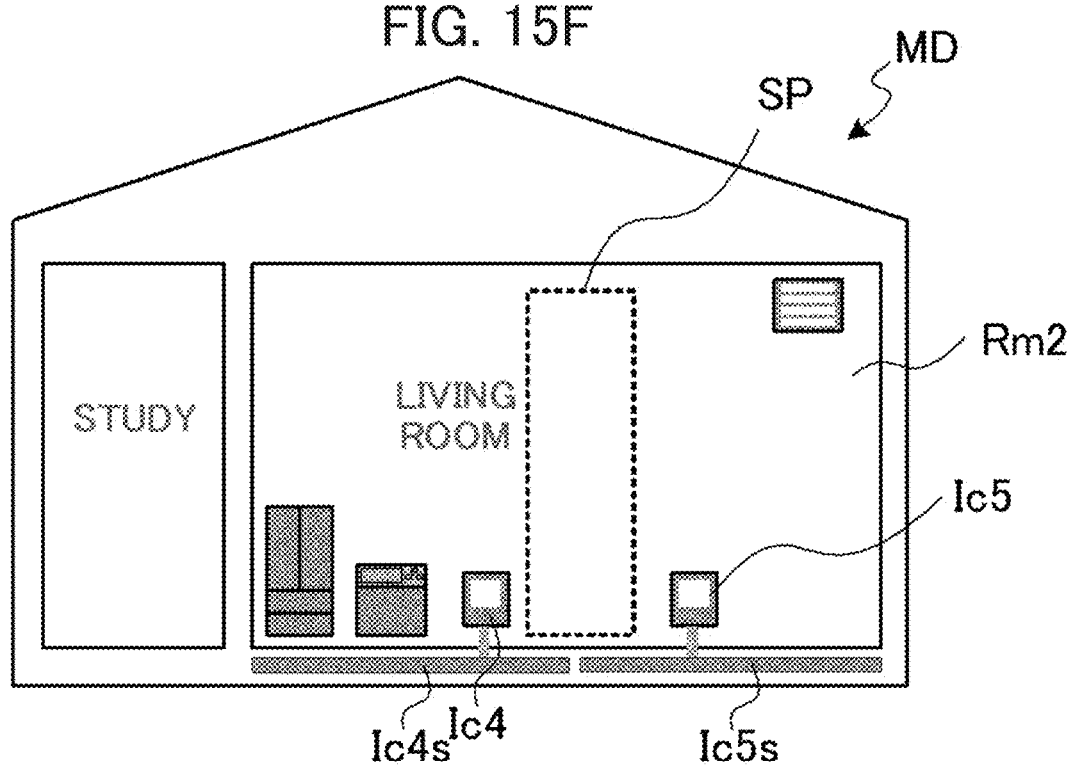
FIG. 15F is a schematic diagram for explaining how the size of the room is increased or decreased.

In addition, an icon may also have a supplementary icon added to itself. For example, as illustrated in FIG. 15E, when an icon Ic4 indicating a floor heater is positioned in the room Rm2, a supplementary icon Ic4s is positioned along the bottom (beneath the floor) of the room Rm2 The supplementary icon Ic4s is an icon added to clearly indicate that the device is a floor heater, and the length of the supplementary icon Ic4s is extended or reduced according to the length of the floor of the room Rm2 where the floor heater is installed. In other words, when the size of the room Rm2 increases or decreases as discussed above, the width of the supplementary icon Ic4s is also extended or reduced correspondingly. Note that in some cases, multiple icons for floor heaters (such as the icon Ic4) are positioned adjacently in the same room. In this case, the floor plan editor 252 increases the size of the room by a margin of fixed width in order to make space between the icons. For example, when an icon of a new floor heater is added next to the icon Ic4 of the room Rm2 illustrated in FIG. 15E, the floor plan editor 252 appropriately increases the size of the room Rm2 to include a space SP, as illustrated in FIG. 15F. In other words, the floor plan editor 252 increases the size of the room Rm2 according to the newly positioned icon Ic5 and the automatically inserted space SP. Note that in this case, the supplementary icons Ic4s and Ic5s are positioned along the bottom of the room Rm2, with one end of each separated from each other in the middle below the space SP. Note that the space SP may not only be inserted automatically in this way, but may also be freely inserted between icons or the like, in accordance with a user instruction.

Figure 16A:
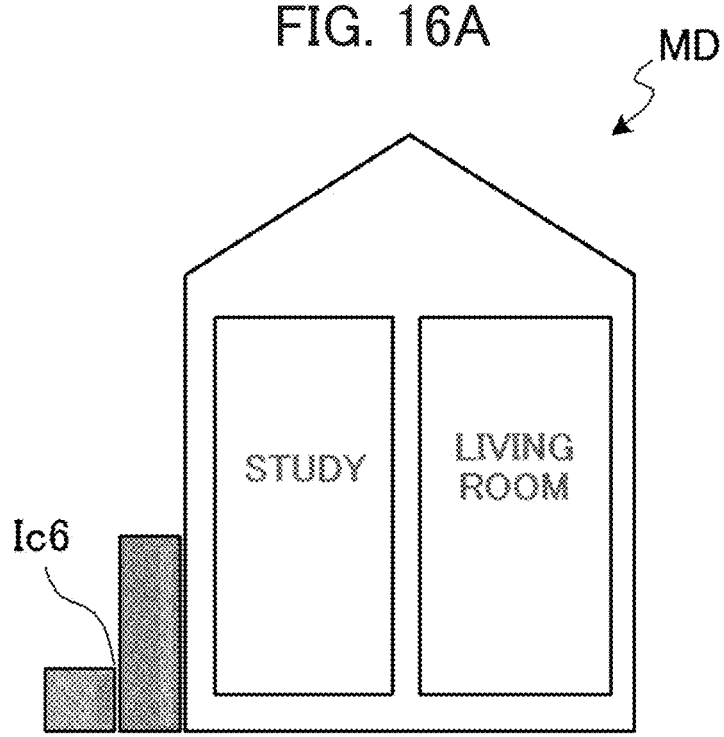
FIG. 16A is a schematic diagram for explaining how an icon is automatically positioned.
Figure 16B:
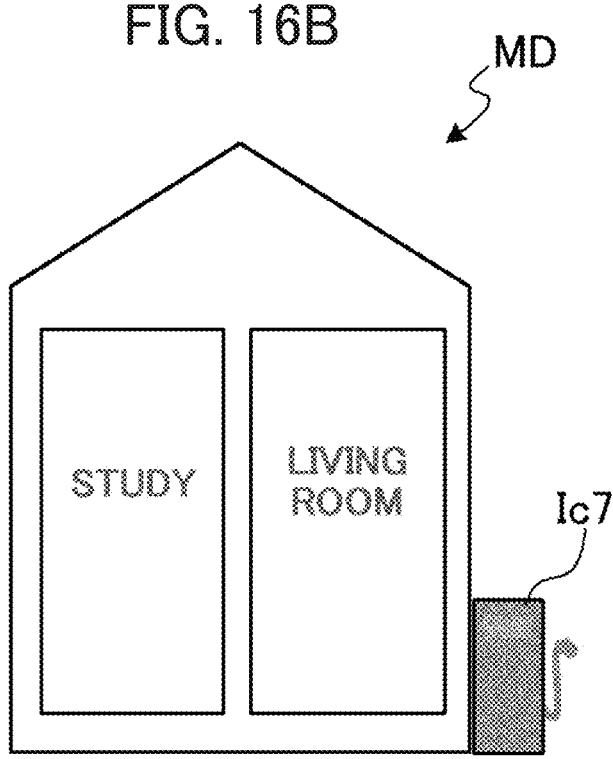
FIG. 16B is a schematic diagram for explaining how an icon is automatically positioned.
Figure 16C:
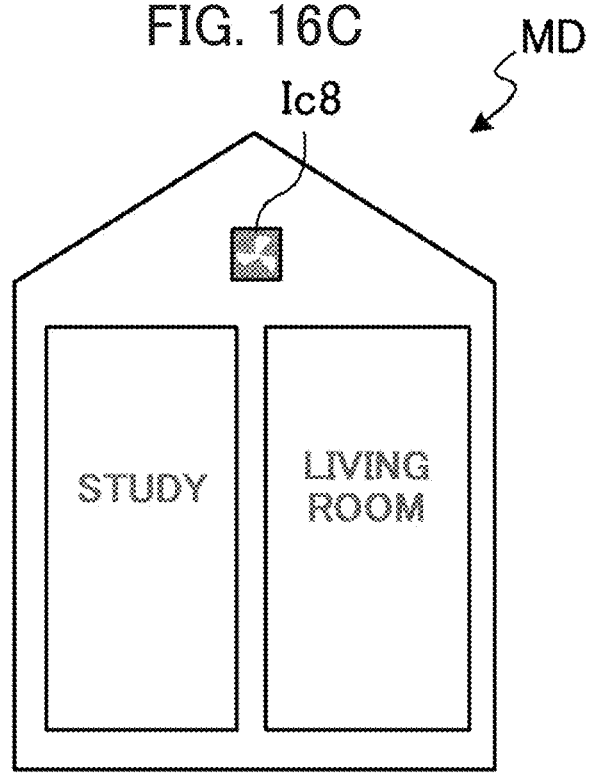
FIG. 16C is a schematic diagram for explaining how an icon is automatically positioned.
Figure 16D:
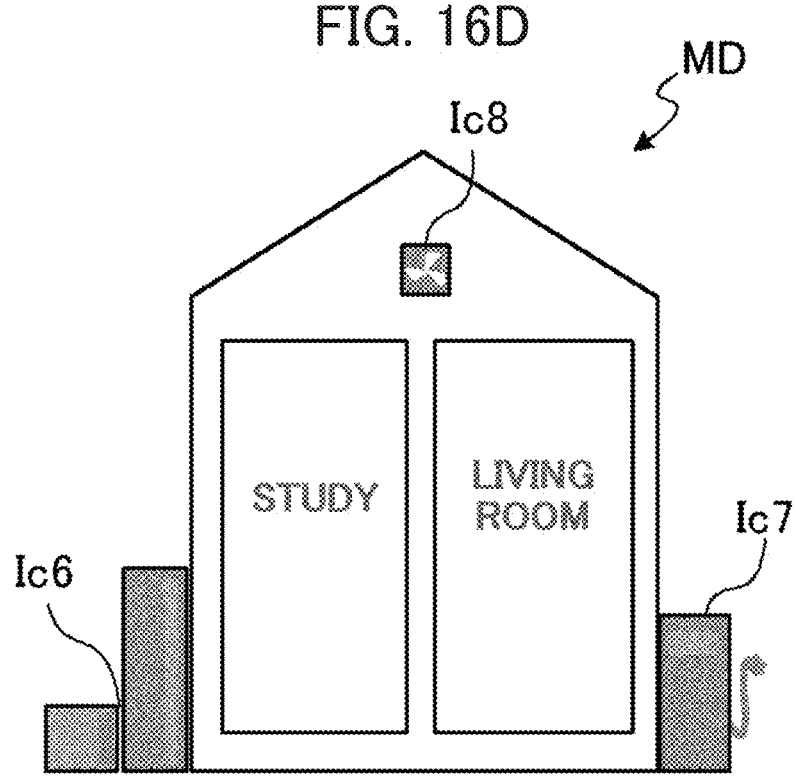
FIG. 16D is a schematic diagram for explaining how icons are automatically positioned.

The foregoing embodiment describes a case in which an icon is positioned in the floor plan image MD according to a drag operation by the user, but for an icon of an electric device 4 whose installation is predetermined in a fixed location outdoors (outside the home), outside a room or the like, the icon may be positioned automatically in the initial state. For example, when a water heater installed outdoors (heat pump water heater) is stored in the device information 241 discussed earlier, the device icon positioner 253 automatically positions an icon Ic6 indicating the water heater, as illustrated in FIG. 16A. As another example, when a power conditioning system (PCS) installed outdoors is stored in the device information 241, the device icon positioner 253 automatically positions an icon Ic7 indicating the PCS, as illustrated in FIG. 16B. In yet another example, when a ventilation system disposed in the ceiling cavity is stored in the device information 241, the device icon positioner 253 automatically positions an icon Ic8 indicating the ventilation system, as illustrated in FIG. 16C. These icons Ic6 to Ic8 have different positioning locations on the floor plan image MD, and may be positioned respectively even when all are provided, as illustrated in FIG. 16D. Note that the positioning locations and shapes of the icons Ic6 to Ic8 are an example, and may be modified as appropriate.

Figure 17B:
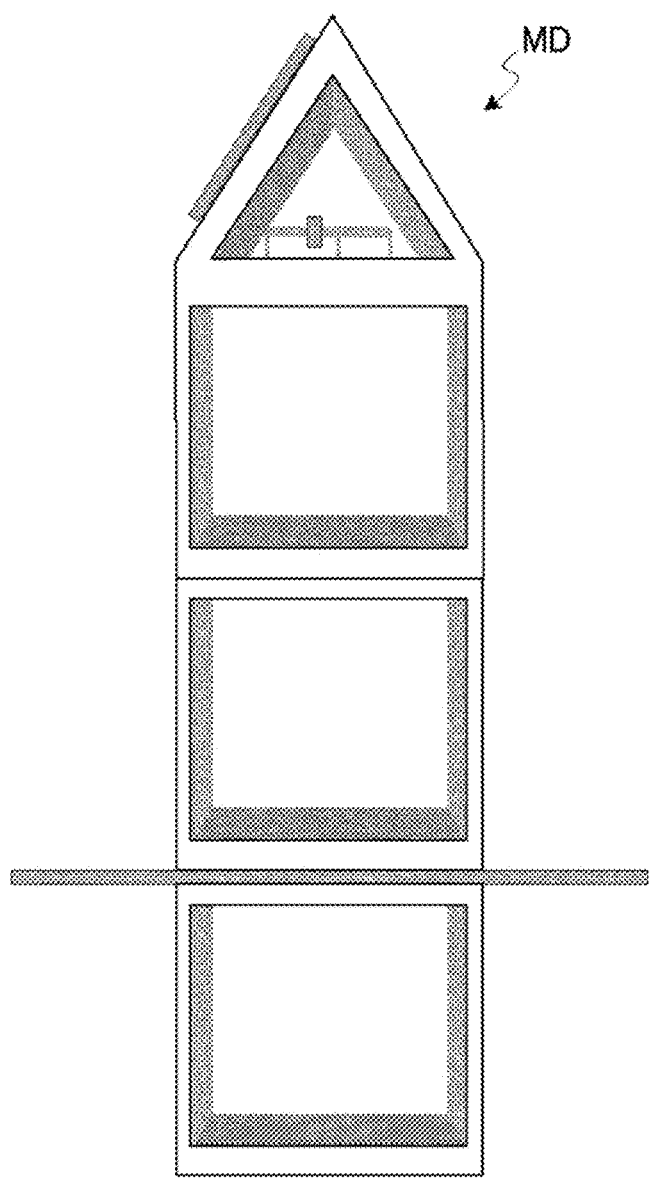
FIG. 17B is a schematic diagram for explaining a floor plan editing technique according to another embodiment of the present disclosure.
Figure 17C:
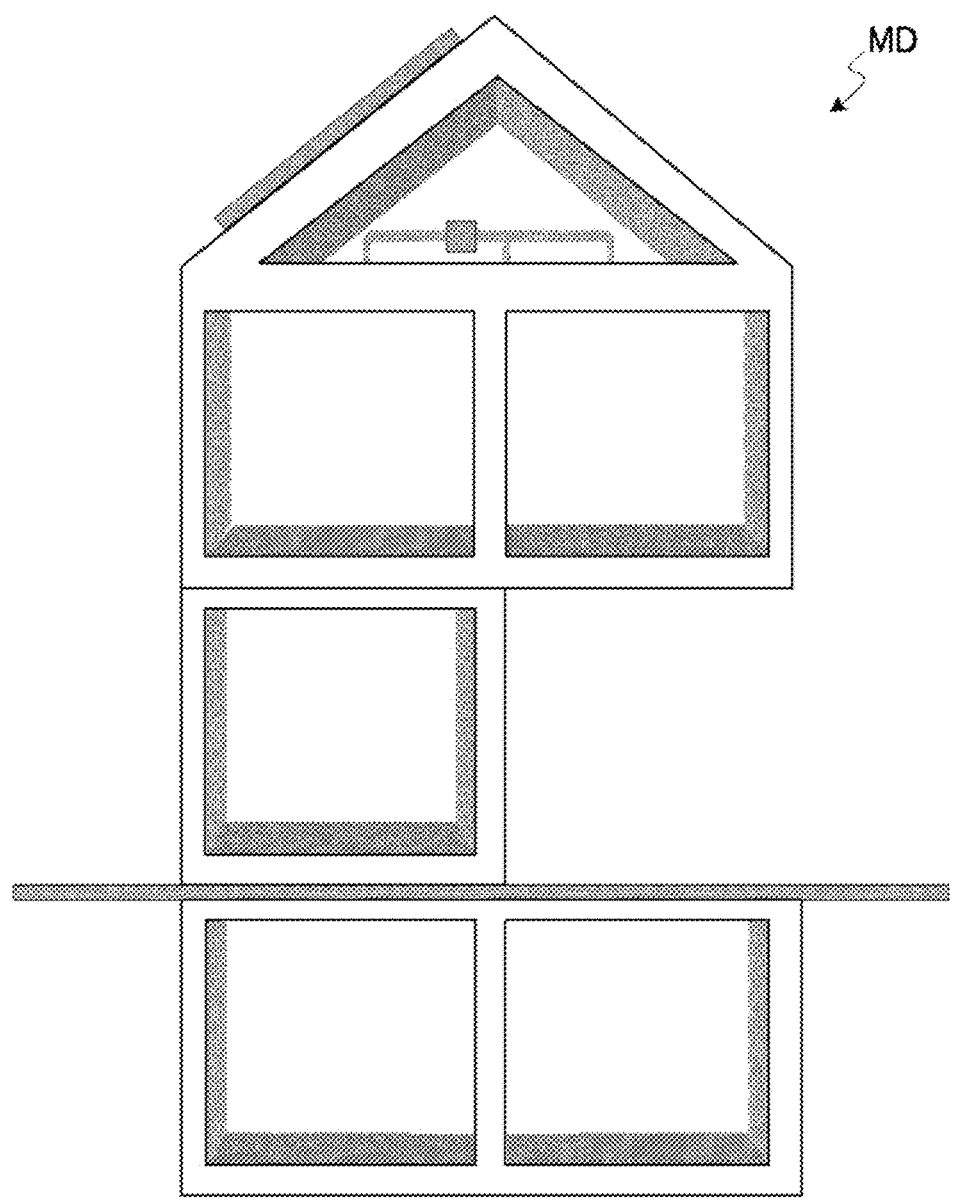
FIG. 17C is a schematic diagram for explaining a floor plan editing technique according to another embodiment of the present disclosure.

The foregoing embodiment describes a case, as illustrated in FIG. 3, in which the user presses buttons Bt1 to Bt3 on the floor plan image MD to add an upper or lower floor or a room. However, the method of editing the floor plan is not limited to pressing such buttons Bt1 to Bt3, and other methods may also be used. For example, as illustrated in FIG. 17A, the user may also be enabled to set the number of floors and the number of rooms with a settings dialog SD. For example, the user operates a plus button PBt and a minus button MBt on the settings dialog SD to set the number of rooms and the like. As yet another example, the user may also be enabled to directly input information such as the number of rooms on the settings dialog SD. As an example, the floor plan image MD in FIG. 17A illustrates the case in which two rooms are set on the first floor only. Note that the initial value of the number of rooms when a number of floors is specified by a user operation is set to one room for each floor. For example, when each of a second floor, a first floor, and a basement floor is specified with the settings dialog SD, a floor plan image MD in which each floor is made up of one room is generated, as illustrated in FIG. 17B. In this state, when a number of rooms equal to two or greater is specified on any of the floors, a floor plan image MD with a left-aligned layout is generated. For example, from the state in FIG. 17B, when two rooms (a number of rooms equal to two) is specified for each of the second floor and the basement floor, a floor plan image MD with overhang (a projecting shape like a canopy) as illustrated in FIG. 17C is generated.

Figure 18A:
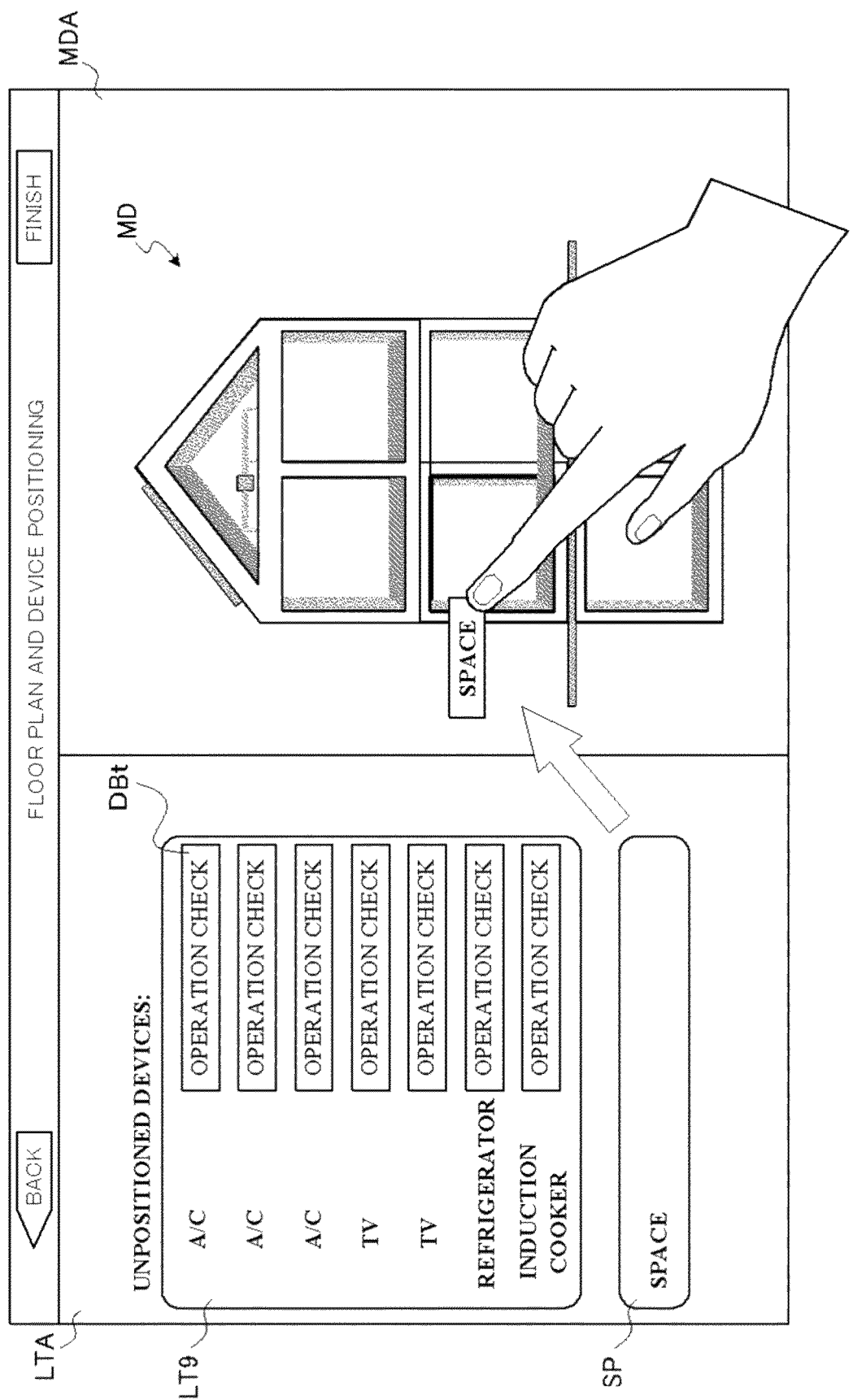
FIG. 18A is a schematic diagram for explaining how to resolve overhang in a floor plan image.
Figure 18B:
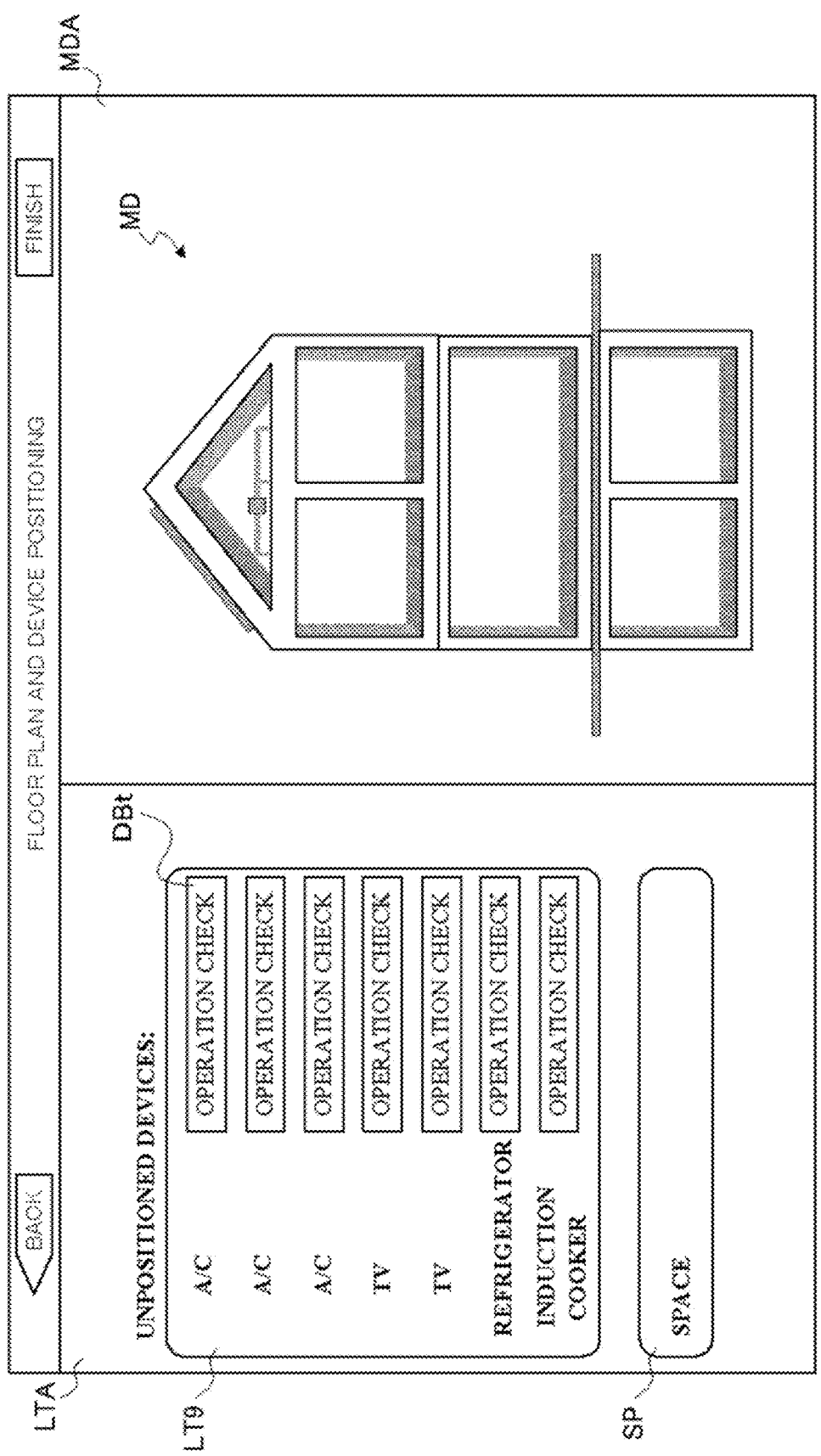
FIG. 18B is a schematic diagram for explaining how to resolve overhang in the floor plan image.

The floor plan may be finalized while leaving the floor plan image MD with such overhang as-is, or be amended to a floor plan image MD with the overhang resolved according to a user instruction. For example, as illustrated in FIG. 18A, a space item SP may be added inside the list area LTA, and when the user desires to widen a room in the floor plan image MD, a drag operation (drag and drop) may be enabled, similarly to the device positioning discussed earlier. Specifically, by dragging the space item SP into the room on the first floor in the floor plan image MD in FIG. 18A, the floor plan image MD is amended to a floor plan image MD with the overhang resolved, as illustrated in FIG. 18B.

Also, the foregoing embodiment describes a case in which, when positioning a device into the floor plan image MD, an operation check of the device is conducted with the button DBt on the dialog DA2, as illustrated in FIG. 8C. However, the operation check may also be possible to conduct before positioning the device into the floor plan image MD. For example, as illustrated in FIGS. 18A and 18B discussed above, the button DBt for giving an instruction to perform an operation check may be added inside the device list LT9, enabling an operation check of a device to be conducted before positioning that device in the floor plan image MD.

Also, although the foregoing embodiment describes a case in which the controller 3 collects device information from each electric device 4 (or controls each electric device 4), the terminal device 2 may also be configured to collect device information directly from each electric device 4 (or control each electric device 4 directly). In this case, the terminal device 2 rather than the controller 3 (control module 33) causes the control module 25 to realize the functions of the above device information collector 331 or control command module 332. Also, in this case, centralized control may be conducted by respectively transmitting command data (such as a control signal) directly from the terminal device 2 to each target electric device 4 by ad hoc communication or the like, without using the home network 5.

Also, the foregoing embodiment describes a case of using a dedicated terminal device 2 and controller 3, but by applying an operating program stipulating the operation of the terminal device 2 and the controller 3 to an existing personal computer, information terminal device, or the like, it is possible to cause such a personal computer or the like to function as the terminal device 2 and the controller 3 according to the present disclosure.

Also, the method of distributing such a program is freely selected, and the program may be stored and distributed on a non-transitory computer-readable recording medium such as a compact disc read-only memory (CD-ROM), a digital versatile disc (DVD), a magneto-optical (MO) disc, or a memory card, and the like, and may also be distributed via a communication network such as the Internet.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This disclosure is based on Japanese Patent Application No. 2013-118986 filed in the Japan Patent Office on Jun. 5, 2013. The entirety of the specification, claims, and drawings of Japanese Patent Application No. 2013-118986 are hereby incorporated by reference.

INDUSTRIAL APPLICABILITY

The present disclosure may be implemented in a layout generation system, an energy management system, a terminal device, a layout generation method, and a program enabling the easy generation of layout information for electric devices connected to a network in a home.

REFERENCE SIGNS LIST

1 Layout generation system
2 Terminal device
3 Controller
4 Electric device
5 Home network
21, 31, 41 Communication module
22 Display
23 Input interface
24, 32, 42 Data storage
25, 33, 44 Control module
43 Main function
241 Device information
242 Floor plan information
243 Layout information
251 Device information acquirer
252 Floor plan editor
253 Device icon positioner
254 Layout generator
331 Device information collector
332 Control command module
441 Control execution module

The invention claimed is:

1. A layout generation system for generating layout information for an electric device connected to a network in a home, comprising:
a processor and a memory, wherein the processor is hardware, wherein the processor is configured to execute a program stored in the memory to
edit, on an editing screen, a floor plan of the home in accordance with a first use rope ration, wherein responsive to the first user operation the processor performs a predetermined operation to add or delete at least a room in the floor plan which is displayed on the editing screen;
position, on the editing screen, in accordance with a second user operation, an icon indicating the electric device in each room in the edited floor plan, wherein the icon represents that the electric device is communicably connected to the network in the home;
generate, based on the edited floor plan and the positioned icon being positioned in the room, layout information in which the room and the electric device are associated with each other which indicates that the electric device is actually installed in the room; and
generate, based on the layout information, a floor plan image made up of rooms in which electric devices are actually installed,
wherein the processor is further configured to
communicate with the electric device which is connected to the network in the home to acquire, from the electric device, device information, including a type of the electric device, for the electric device; and
display, on the editing screen, the icon corresponding to the type of the electric device, the icon representing that the electric device is communicably connected to the network.

2. The layout generation system according to claim 1, wherein
the processor is further configured to move, in accordance with the second user operation, the icon of the electric device into the floor plan, and position the icon of the electric device in a target room.

3. The layout generation system according to claim 1, wherein
the processor is configured to move, in accordance with the second user operation, the icon of the electric device to a room list associated with each room in the edited floor plan, and position the icon of the electric device in the room in the floor plan corresponding to a destination in the room list.

4. The layout generation system according to claim 1, wherein the processor is further configured to:
acquire device information of the electric device via a network,
generate, based on the acquired device information, the icon of the electric device associated with the electric device, and position the icon of the electric device in a room in the floor plan in accordance with the second user operation, and
change a size of the room in the floor plan based on the device information corresponding to the positioned icon of the electric device.

5. The layout generation system according to claim 1, wherein the processor is further configured to:
take as an initial state a floor plan made up of a predetermined number of rooms, and
automatically position, in the floor plan of the initial state, the icon of the electric device having an installation position determined to be outdoors or in a fixed position.

6. The layout generation system according to claim 1, wherein the processor is further configured to:
when positioning in the floor plan the icon of a predetermined electric device, automatically add and position a supplementary icon.

7. An energy management system for managing an electric device connected to a network in a home, comprising:
a processor and a memory, wherein the processor is hardware, wherein the processor is configured to execute a program stored in the memory to
edit, on an editing screen, a floor plan of the home in accordance with a first use rope ration, wherein responsive to the first user operation the processor performs a predetermined operation to add or delete at least a room in the floor plan which is displayed on the editing screen;
position, on the editing screen, in accordance with a second user operation, an icon indicating the electric device in each room in the edited floor plan, wherein the icon represents that the electric device is communicably connected to the network in the home; and
generate, based on the edited floor plan and the positioned icon being positioned in the room, layout information in which the room and the electric device are associated with each other which indicates that the electric device is actually installed in the room, the layout information for use in managing the electric device connected to the network in the home,
wherein the processor is further configured to
communicate with the electric device which is connected to the network in the home to acquire, from the electric device, device information, including a type of the electric device, for the electric device; and
display, on the editing screen, the icon corresponding to the type of the electric device, the icon representing that the electric device is communicably connected to the network.

8. A terminal device connected to an electric device connected to a network in a home, comprising:
a processor and a memory, wherein the processor is hardware, wherein the processor is configured to execute a program stored in the memory to
edit, on an editing screen, a floor plan of the home in accordance with a first use rope ration, wherein responsive to the first user operation the processor performs a predetermined operation to add or delete at least a room in the floor plan which is displayed on the editing screen;
position, on the editing screen, in accordance with a second user operation, an icon indicating the electric device in each room in the edited floor plan, wherein the icon represents that the electric device is communicably connected to the network in the home; and
generate, based on the edited floor plan and the positioned icon being positioned in the room, layout information in which the room and the electric device are associated with each other which indicates that the electric device is actually installed in the room, the layout information for use in managing the electric device connected to the network in the home or for generating a floor plan image made up of rooms in which electric devices are actually installed,
wherein the processor is further configured to
communicate with the electric device which is connected to the network in the home to acquire, from the electric device, device information, including a type of the electric device, for the electric device; and
display, on the editing screen, the icon corresponding to the type of the electric device, the icon representing that the electric device is communicably connected to the network.

9. A layout generation method in an energy management system for managing an electric device connected to a network in a home, comprising:
editing, by a processor, on an editing screen, a floor plan of the home in accordance with a first user operation, wherein responsive to the first user operation the processor performs a predetermined operation to add or delete at least a room in the floor plan which is displayed on the editing screen;
positioning, by the processor, on the editing screen, in accordance with a second user operation, an icon indicating the electric device in each room in the edited floor plan, wherein the icon represents that the electric device is communicably connected to the network in the home; and
generating, by the processor, based on the edited floor plan and the positioned icon being positioned in the room, layout information in which the room and the electric device are associated with each other which indicates that the electric device is actually installed in the room, the layout information for use in managing the electric device connected to the network in the home, further comprising
communicating, by the processor, with the electric device which is connected to the network in the home to acquire, from the electric device, device information, including a type of the electric device, for the electric device; and
displaying, by the processor, on the editing screen, the icon corresponding to the type of the electric device, the icon representing that the electric device is communicably connected to the network.

10. A non-transitory recording medium having stored therein a program for causing a computer connected to an electric device connected to a network in a home to:
execute a process of editing, on an editing screen, a floor plan of the home in accordance with a first user operation, wherein responsive to the first user operation the processor performs a predetermined operation to add or delete at least a room in the floor plan which is displayed on the editing screen;
execute a process of positioning, on the editing screen, in accordance with a second user operation, an icon indicating the electric device in each room in the edited floor plan, wherein the icon represents that the electric device is communicably connected to the network in the home; and
execute a process of generating, based on the edited floor plan and the positioned icon being positioned in the room, layout information in which the room and the electric device are associated with other which indicates that the electric device is actually installed in the room, the layout information for use in managing the electric device connected to the network in the home or for generating a floor plan image made up of rooms in which electric devices are actually installed,
wherein the program further causes the computer to
communicate with the electric device which is connected to the network in the home to acquire, from the electric device, device information, including a type of the electric device, for the electric device; and
display, on the editing screen, the icon corresponding to the type of the electric device, the icon representing that the electric device is communicably connected to the network.

11. The layout generation system according to claim 1, wherein
the processor is further configured to
display the electric device that is unpositioned, in a device list, and
position the icon of the electric device selected from the device list in a target room in the floor plan, in accordance with the second user operation.

12. The layout generation system according to claim 1, wherein
the processor is further configured to reposition the icon of the electric device already positioned in a room in the floor plan to another room, in accordance with the second user operation.

13. The layout generation system according to claim 1, wherein the processor is further configured to:
responsive to the icon of the electric device being positioned adjacently to an icon of another device that is of a same type, in a same room in the floor plan, automatically insert a space in order to provide spacing between the icons of the electric devices of the same type.

14. The layout generation system according to claim 1, wherein the processor is further configured to
responsive to the icon of the electric device being positioned in a room in the floor plan;
display a confirmation screen in order to confirm an operation of the electric device indicated by the icon of electric device, and
issue a control command to operate the electric device, in accordance with the confirmation screen.

15. The layout generation system according to claim 1, wherein the processor is further configured to
cause a display to visually provide the editing screen having (i) the floor plan for the first user operation, (ii) responsive to the first user operation, the edited floor plan illustrating in the editing screen all rooms of a plurality of rooms in the edited floor plan, and (iii) responsive to the second user operation, the positioned icon indicating the electric device in each room of the plurality of rooms of the edited floor plan; and
store, in a data storage, the layout information which is generated after the icon is positioned in each room of the edited floor plan.

16. The layout generation system according to claim 1, wherein the floor plan includes a plurality of rooms and wherein the floor plan image includes a plurality of icons representing a respective plurality of the electric devices, wherein the processor is further configured to
initially make a size of each room of the plurality of rooms to be a uniform size determined by a number of the rooms in each floor of the floor plan;
receive, via an input interface, the second user operation to position at least one icon of the plurality of icons into at least one room of the plurality of rooms on the editing screen;
determine, by a processor, the numbers of icons positioned in each room; and
automatically increase and decrease the size of each room in the floor plan image according to a number of the icons determined to be positioned in each room.

* * * * *